United States Patent
Kato et al.

[11] Patent Number: 5,964,320
[45] Date of Patent: Oct. 12, 1999

[54] BRAKE SHOE FOR ELEVATOR EMERGENCY STOP

[75] Inventors: Masahiro Kato, Kanagawa-ken; Yasuhiro Goto, Tokyo; Takayuki Fukasawa; Hidehiko Kobayashi, both of Kawasaki; Toshiaki Nakagawa, Akiruno, all of Japan

[73] Assignee: Kabushiki Kaisha Toshiba, Kawasaki, Japan

[21] Appl. No.: 08/803,281

[22] Filed: Feb. 20, 1997

[30] Foreign Application Priority Data

| Sep. 10, 1996 | [JP] | Japan | 8-239157 |
| Oct. 25, 1996 | [JP] | Japan | 8-283987 |
| Feb. 18, 1997 | [JP] | Japan | 9-033658 |

[51] Int. Cl.$^6$ .............. B66B 5/22; F16D 69/02
[52] U.S. Cl. ............ 187/376; 187/375; 188/251 A; 192/107; 428/408
[58] Field of Search .............. 187/373, 375, 187/376; 188/251 A; 192/107; 428/408

[56] References Cited

U.S. PATENT DOCUMENTS

| 2,150,373 | 3/1939 | Hymans | 187/376 |
| 3,441,107 | 4/1969 | Thorne et al. | 187/376 |
| 3,459,842 | 8/1969 | Wakefield | 428/408 |
| 3,991,248 | 11/1976 | Bauer | 428/408 |
| 4,240,835 | 12/1980 | Laskow et al. | 428/408 |
| 4,789,277 | 12/1988 | Rhodes et al. | 409/131 |
| 4,946,807 | 8/1990 | Okuno et al. | 501/89 |
| 5,160,508 | 11/1992 | Pyzik et al. | 51/307 |
| 5,230,946 | 7/1993 | Fisher | 428/408 |
| 5,273,819 | 12/1993 | Jex | 428/408 |

FOREIGN PATENT DOCUMENTS

| A-67978/90 | 6/1990 | Australia . |
| 37 15098 A1 | 11/1987 | Germany . |
| 62-34674 | 7/1987 | Japan . |
| 362235462 | 10/1987 | Japan . |
| 401014177 | 1/1989 | Japan . |
| 401076969 | 3/1989 | Japan . |
| 4011195666 | 5/1989 | Japan . |
| 401179766 | 7/1989 | Japan . |
| 405162945 | 6/1993 | Japan . |
| 406255949 | 9/1994 | Japan . |
| 407165377 | 6/1995 | Japan . |
| 7-206310 | 8/1995 | Japan . |
| 94-19589 | 9/1994 | Rep. of Korea . |
| WO 85/02169 | 5/1985 | WIPO . |
| WO 93/18998 | 9/1993 | WIPO . |

OTHER PUBLICATIONS

Signapore Patent Office Official Action.
Derwent Abstract Accession No: 96–397361/40, Class M26 (M27) JP 08–193238 A. Hitachi Ltd. (Jul. 30, 1996).

*Primary Examiner*—William E. Terrell
*Assistant Examiner*—Patrick Mackey
*Attorney, Agent, or Firm*—Oblon, Spivak, McClelland, Maier & Neustadt, P.C.

[57] ABSTRACT

A brake shoe for an elevator emergency stop has a including a brake body having a braking face and (b) plurality of braking pieces embodied in the braking face side of the brake body to be projected from a braking face. The projection of each of the braking pieces forms a column or a multi-cornered pole having rounded corners. The braking pieces are made of a composite material containing a ceramic base material selected from the group consisting of silicon nitride, silicon carbide and sialon, and particles of at least one ceramic material selected from the group consisting of a carbide, a nitride and a boride. The ceramic particles have a particle size in the range of 10 to 150 μm, and dispersed into the ceramic base material.

18 Claims, 13 Drawing Sheets

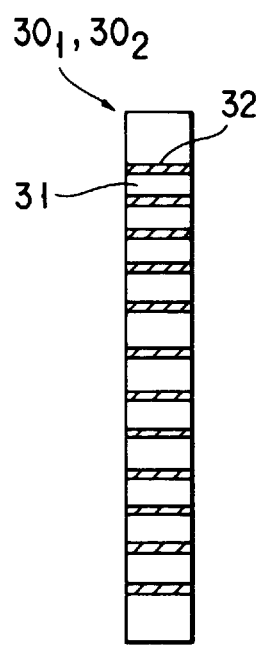 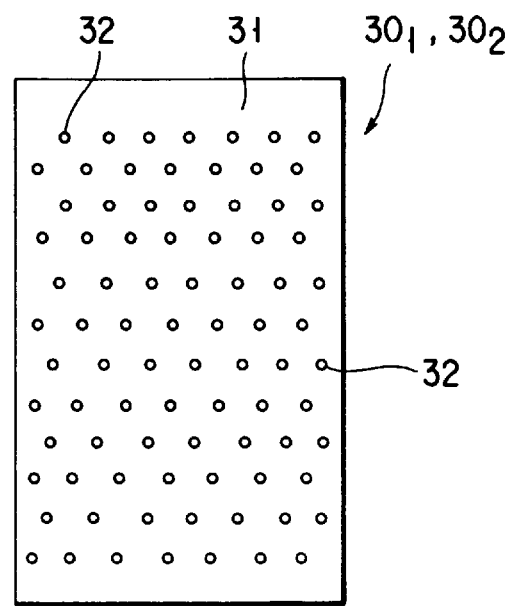
FIG. 5A   FIG. 5B
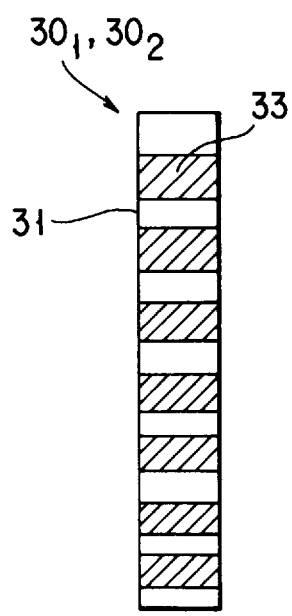 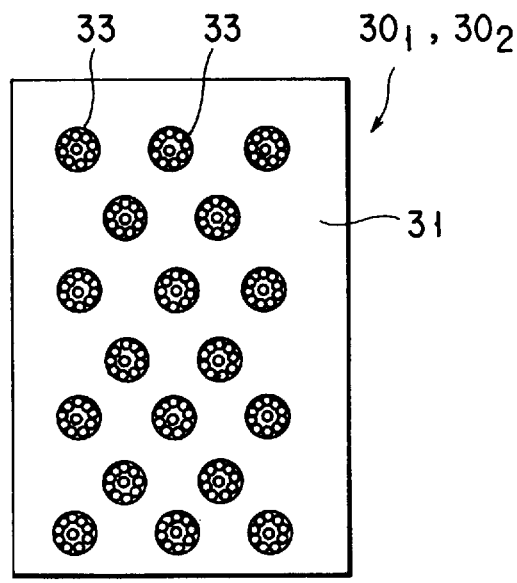
FIG. 6A   FIG. 6B

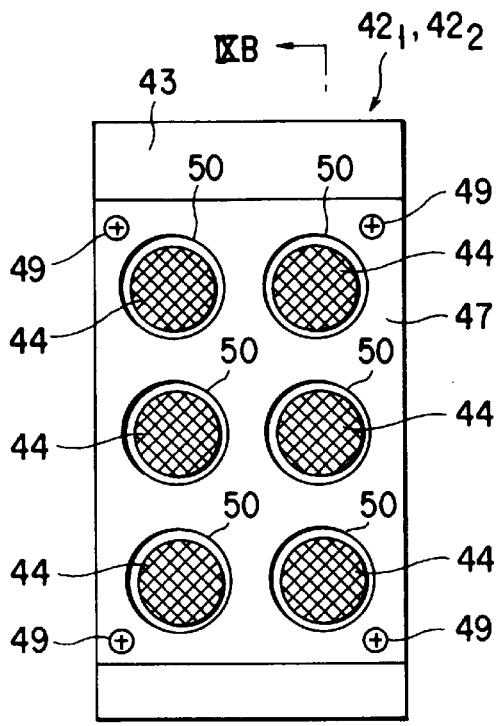
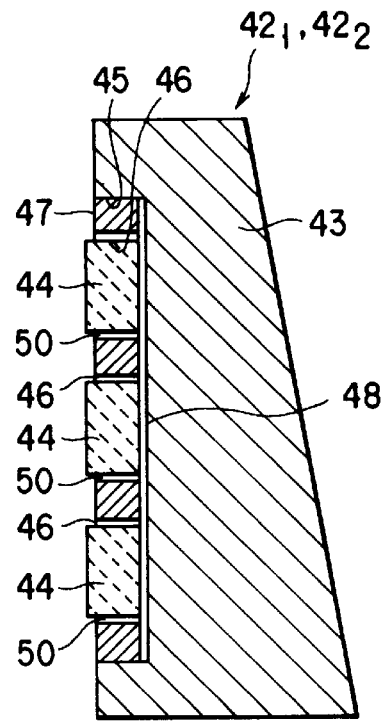
FIG. 9A            FIG. 9B
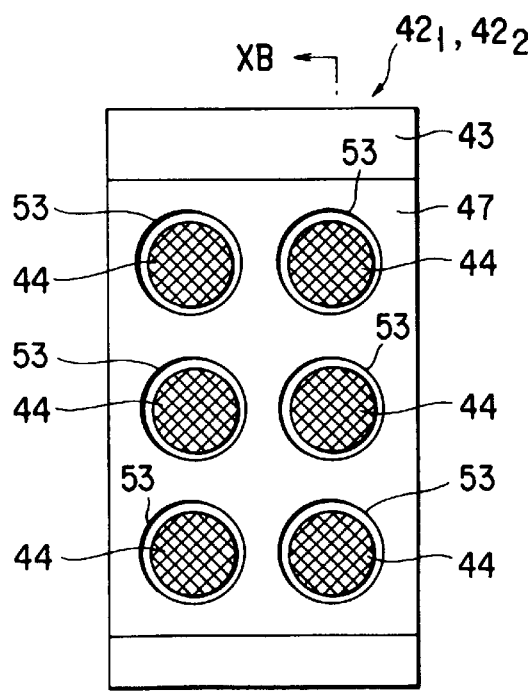
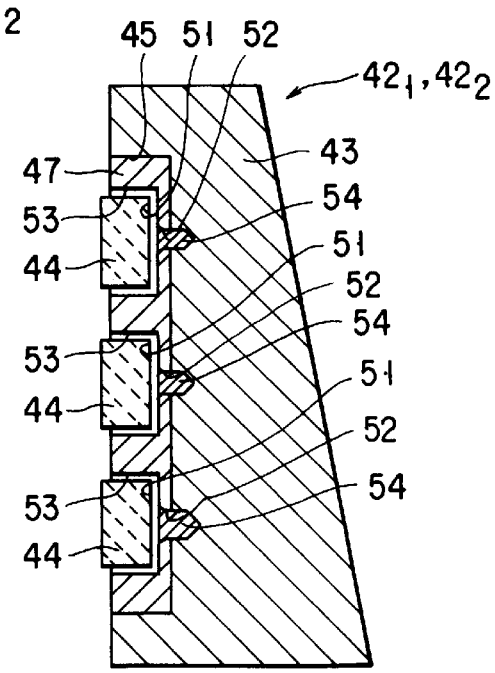
FIG. 10A           FIG. 10B

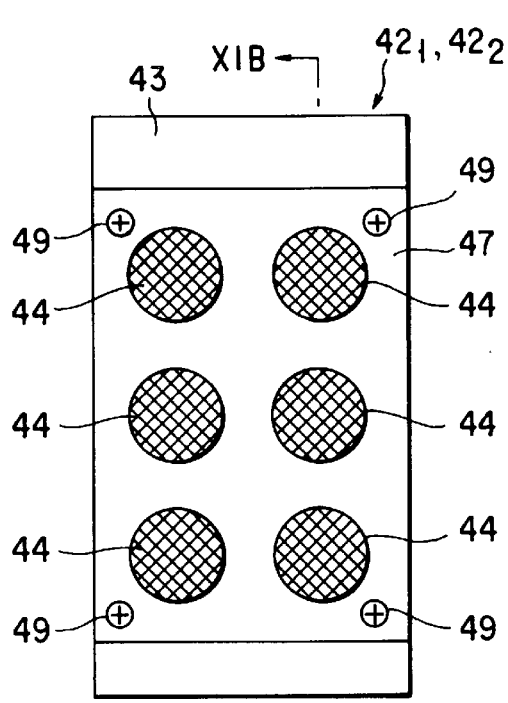
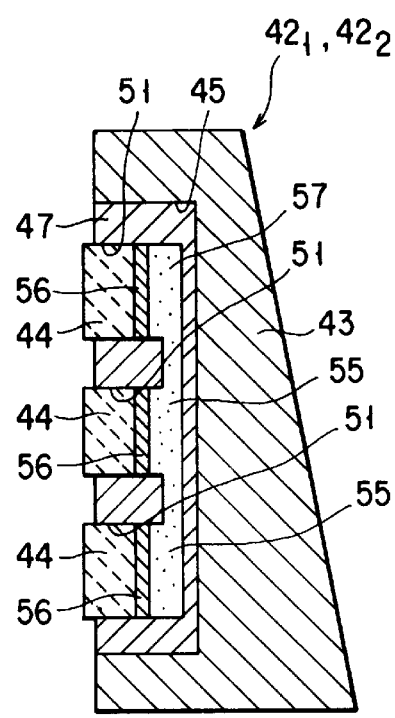
FIG. 11A  FIG. 11B
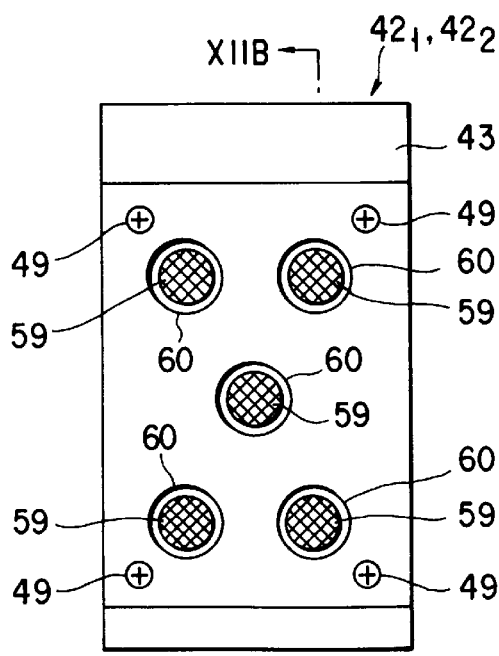
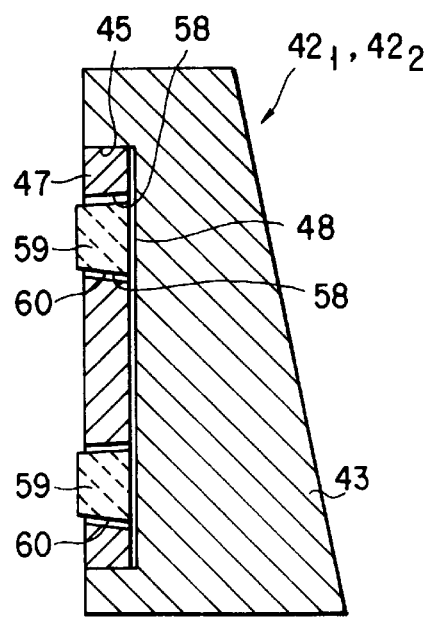
FIG. 12A  FIG. 12B

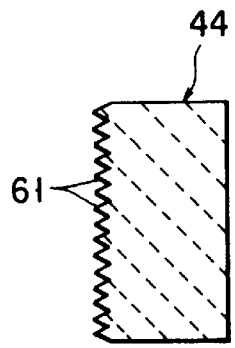
F I G. 13A
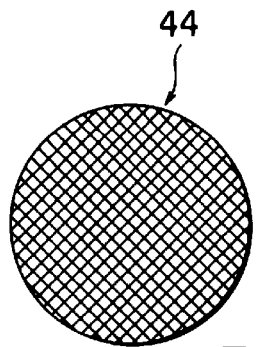
F I G. 13B
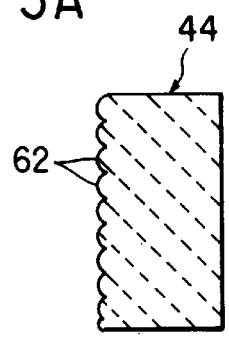
F I G. 14A
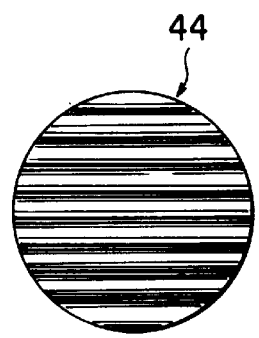
F I G. 14B
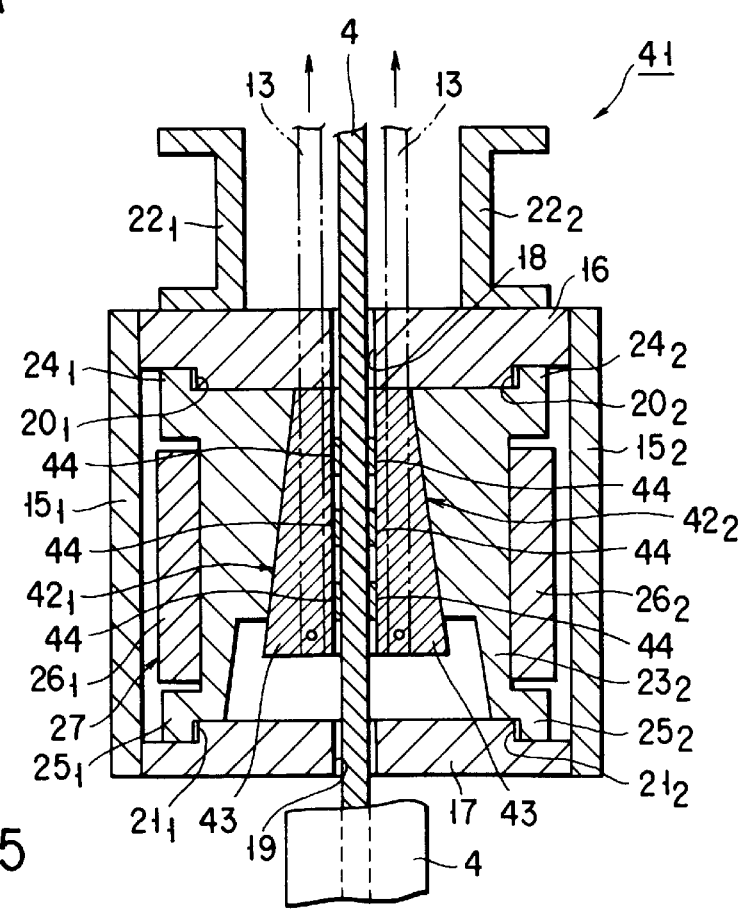
F I G. 15

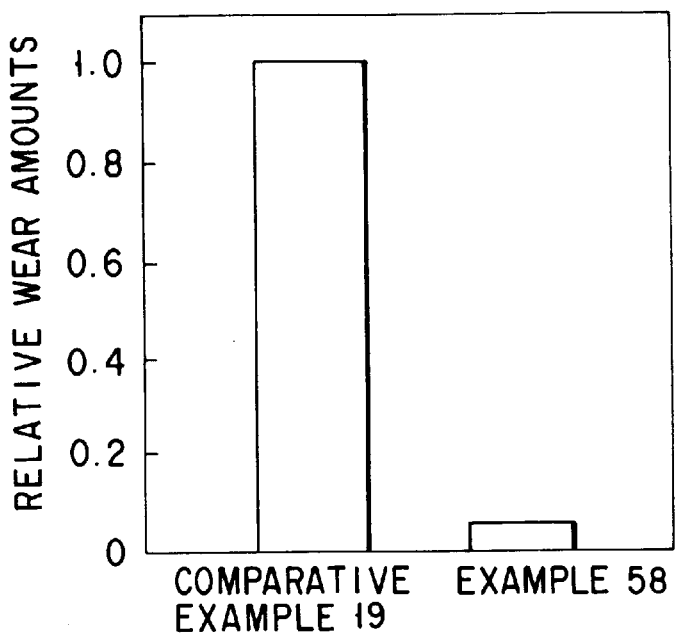
FIG. 22
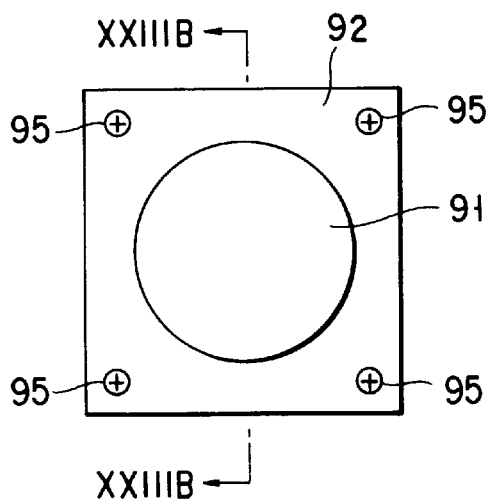 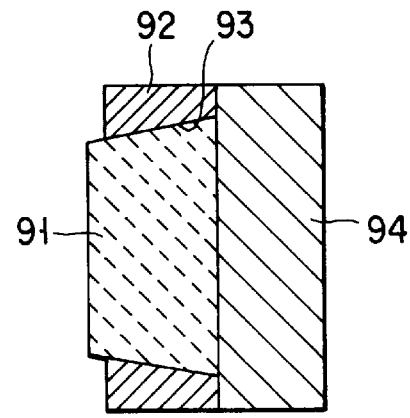
FIG. 23A    FIG. 23B

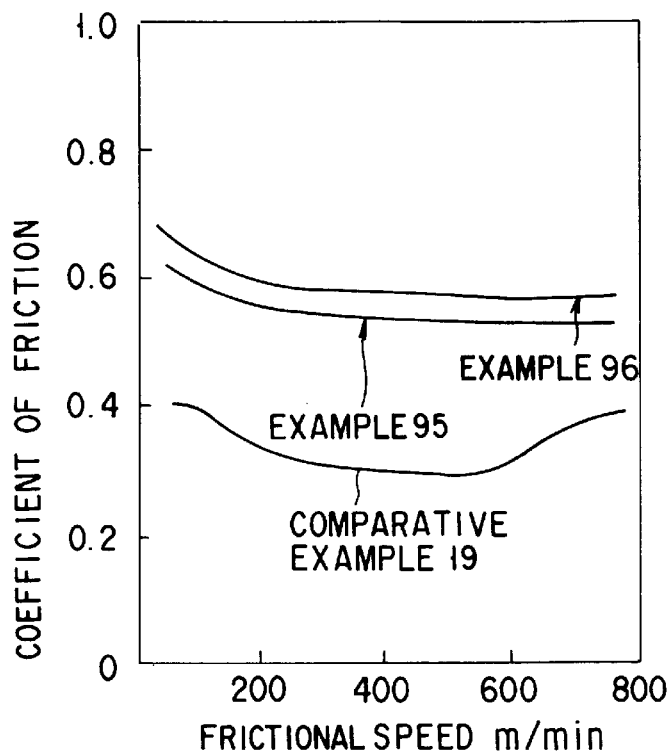
F I G. 26
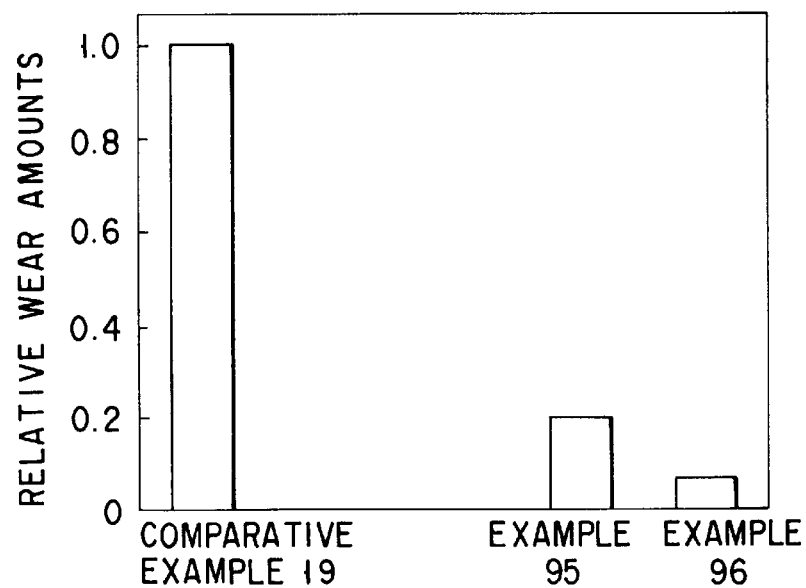
F I G. 27

BRAKE SHOE FOR ELEVATOR EMERGENCY STOP

BACKGROUND OF THE INVENTION

The present invention relates to a brake shoe for elevator emergency stop, a device for elevator emergency stop and an elevator with an emergency stop function.

An elevator is provided with a device for emergency stop in order to prevent a fall due to unexpected breakdown of the elevator. The device for emergency stop comprises a cage elevated by an elevating means, an elastic member attached to the bottom part of the cage and having a U shape, capable of opening in a horizontal direction, a pair of plate-like guide members opposing each other and having outer surfaces contacting the end of the elastic member, respectively, and inner surfaces inclining such that a gap between the guide members gradually decreases toward the upper ends of the guide members, a rail which has a T-shaped cross section and positioned between the guide members and extending in a vertical direction, a pair of brake shoes provided in the gap between the guide members, arranged symmetrically with respect to the rail, capable of moving vertically along the inner surfaces of the guide member, and having braking faces opposing each other, and a pair of pulling means attached to the brake shoes, respectively, for pulling upward each the brake shoes. In such a device for emergency stop, if the cage falls due to the breakdown of the elevating means, the pulling means operates by detecting the falling speed of the cage to cause the elastic member to press the guide members so that the brake shoes pinches the rail and, as a result, the speed of the falling cage is reduced and the cage is stopped by the frictional force between the brake shoes and the rail.

Heretofore, the brake shoes have been made of such materials as cast iron or copper-based sintered alloys having suitable coefficients of friction and wear resistance. However, the recent demand for high-speed and large-capacity elevators because of high-rise buildings has brought about the problems of heat generation due to friction and decrease in the coefficient of friction. For example, the result of a simulation indicates that the localized temperature of the sliding face by friction exceeds 1000° C. in the case where the moving speed of an elevator reaches 800 m/min. If such a temperature generates at the time when the elevator slows down and stops, the use of a brake shoe made of a metal becomes difficult in terms of strength and heat resistance. In addition, another problem is seizure because of the reaction between the brake shoe and the rail after slowing down and stop.

Based on the above-described background, Japanese Patent Application Publication (JP-B) No. 62-34,674 discloses the use of a brake shoe made by embedding a sliding member, which has a plurality of projections formed integrally with a ceramic plate having excellent heat resistance, in the braking face side of the metal body that faces a rail. However, since a plurality of the projections are formed integrally with a ceramic plate, the impact generated by the pinching of the rail at the time of slowing down and stop causes the breakdown of the root of the projections thereby remarkably decreasing the coefficient of friction of the projections, i.e., the braking effect diminishes. In addition, since the amount of wear of the ceramic material is very small, the friction property per unit number of the projections is not always satisfactory. As a result, instant slowing down and stop of the elevator at the time of emergency will become difficult.

BRIEF SUMMARY OF THE INVENTION

One of the object of the present invention is to provide a brake shoe for elevator emergency stop which has a heat resistance to a temperature that exceeds 1000° C. as well as a stabilized high coefficient of friction, an excellent seizure-resistance to rail and a stabilized braking property even under the condition of high speed and high stress.

Another object of the present invention is to provide a brake shoe for elevator emergency stop which has a heat resistance to a temperature that exceeds 1000° C. as well as a stabilized high coefficient of friction, an excellent seizure-resistance to rail, an excellent impact resistance and a stabilized braking property even under the condition of high speed and high stress.

Another object of the present invention is to provide a device for elevator emergency stop having a stabilized braking property and small size.

Still another object of the present invention is to provide an elevator provided with a device for elevator emergency stop where the cage securely slows down and stops without causing seizure on the rail at the time when the cage of the elevator is caused to fall due to the breakdown of the elevating means of the elevator.

According to the present invention there is provided a brake shoe for elevator emergency stop comprising a brake body having a braking face and a braking piece arranged on the braking face side. The braking piece is made of a composite material containing a ceramic base material selected from the group consisting of silicon nitride, titanium boride, sialon and silicon carbide, and no less than 10 wt % of at least one ceramic material selected from the group consisting of a silicon carbide whisker and a silicon carbide platelet.

Also according to the present invention there is provided a device for elevator emergency stop comprising:

an elastic member having a U shape, capable of opening in a horizontal direction;

a pair of guide members opposing each other and having outer surfaces contacting the end of the elastic member, respectively, and inner surfaces inclining such that a gap between the guide members gradually decreases toward the upper ends of the guide member;

a rail having a T-shaped cross section, positioned between the guide members and extending in a vertical direction;

a pair of brake shoes provided in the gap between the guide members, arranged symmetrically with respect to the rail, capable of moving vertically along the inner surfaces of the guide members, and having braking faces opposing each other; and a pair of pulling means attached to the brake shoes, respectively, for pulling upward the brake shoes along the guide members, in the case of emergency, to cause the elastic member to press the guide members so that the brake shoes pinch the rail. The brake shoe comprises (a) a brake body having a braking face and (b) a braking piece arranged on the braking face side. The brake piece is made of a composite material containing a ceramic base material selected from the group consisting of silicon nitride, titanium boride, sialon and silicon carbide, and no less than 10 wt % of at least one ceramic material selected from the group consisting of a silicon carbide whisker and a silicon carbide platelet.

Further, according to the present invention there is provided an elevator with an emergency stop function comprising:

a cage;

an elevating means for elevating the cage;

an elastic member having a U shape, capable of opening in a horizontal direction and attached to the bottom part of the cage by a supporting means;

a pair of guide members opposing each other and having outer surfaces contacting the end of the elastic member, respectively, and inner surfaces inclining such that a gap between the guide members gradually decreases toward the upper ends of the guide member;

a rail having a T-shaped cross section, positioned between the guide members and extending in a vertical direction;

a pair of brake shoes provided in the gap between the guide members, arranged symmetrically with respect to the rail, capable of moving vertically along the inner surfaces of the guide members, and having braking faces opposing each other; and a pair of pulling means attached to the brake shoes, respectively, for pulling upward the brake shoes along the guide members, at the time when the cage falls due to the breakdown of the elevating means, to cause the elastic member to press the guide members so that the brake shoes pinch the rail. The brake shoe comprises (a) a brake body having a braking face and (b) a braking piece arranged on the braking face side. The brake piece is made of a composite material containing a ceramic base material selected from the group consisting of silicon nitride, titanium boride, sialon and silicon carbide, and no less than 10 wt % of at least one ceramic material selected from the group consisting of a silicon carbide whisker and a silicon carbide platelet.

Further, according to the present invention there is provided a brake shoe for elevator emergency stop comprising a brake body having a braking face and a braking piece positioned on the braking face side. The brake piece is made of a composite material containing a ceramic base material selected from the group consisting of silicon nitride, titanium boride, sialon and silicon carbide, and a plurality of ceramic fibers dispersed and embedded in the base material to be present in a vertical state at the braking face.

Further, according to the present invention there is provided a device for elevator emergency comprising:

an elastic member having a U shape, capable of opening in a horizontal direction;

a pair of guide members opposing each other and having outer surfaces contacting the end of the elastic member, respectively, and inner surfaces inclining such that a gap between the guide members gradually decreases toward the upper ends of the guide member;

a rail having a T-shaped cross section, positioned between the guide members and extending in a vertical direction;

a pair of brake shoes provided in the gap between the guide members, arranged symmetrically with respect to the rail, capable of moving vertically along the inner surfaces of the guide members, and having braking faces opposing each other; and a pair of pulling means attached to the brake shoes, respectively, for pulling upward the brake shoes along the guide members, in the case of emergency, to cause the elastic member to press the guide members so that the brake shoes pinch the rail. The brake shoe comprises (a) a brake body having a braking face and (b) a braking piece arranged on the braking face side. The braking piece is made of a composite material containing a ceramic base material selected from the group consisting of silicon nitride, titanium boride, sialon and silicon carbide, and a plurality of ceramic fibers dispersed and embedded in the base material to be present in a vertical state at the braking face.

Further, according to the present invention there is provided elevator with an emergency stop function comprising:

a cage;

an elevating means for elevating the cage;

an elastic member having a U shape, capable of opening in a horizontal direction and attached to the bottom part of the cage by a supporting means;

a pair of guide members opposing each other and having outer surfaces contacting the end of the elastic member respectively, and inner surfaces inclining such that a gap between the guide members gradually decreases toward the upper ends of the guide member;

a rail having a T-shaped cross section, positioned between the guide members and extending in a vertical direction;

a pair of brake provided in the gap between the guide members, arranged symmetrically with respect to the rail, capable of moving vertically along the inner surfaces of the guide members, and having braking faces opposing each other; and a pair of pulling up means attached to the brake shoes, respectively, for pulling upward the brake shoes along the guide member, at the time when the cage falls due to the breakdown of the elevating means, to cause the elastic members to press the guide members so that the brake shoes pinch the rail. The brake shoe comprises (a) a brake body and having a braking face (b) a braking piece arranged on the braking face side. The braking piece is made of a composite material containing a ceramic base material selected from the group consisting of silicon nitride, titanium boride, sialon and silicon carbide, and a plurality of ceramic fibers dispersed and embedded in the base material to be present in a vertical state at the braking face.

Further, according to the present invention there is provided a brake shoe for elevator emergency stop comprising (a) a brake body having a braking face and (b) a plurality of braking pieces embedded in the braking face side of the brake body to be projected from the braking face. The projection of each of the braking pieces forms column or a multi-cornered pole having rounded corners. Each of the braking pieces is made of a composite material containing a ceramic base material selected from the group consisting of silicon nitride, silicon carbide and sialon and particles of at least one ceramic material selected from the group consisting of a carbide, a nitride and a boride. The ceramic particles have particle size in the range of 10 to 150 $\mu$m, and dispersed into the ceramic base material.

Further, according to the present invention there is provided a device for elevator emergency stop comprising:

an elastic member having a U shape, capable of opening in a horizontal direction;

a pair of guide members opposing each other and having outer surfaces contacting the end of the elastic member, respectively, and inner surfaces inclining such that a gap between the guide members gradually decreases toward the upper ends of the guide member;

a rail having a T-shaped cross section, positioned between the guide members and extending in a vertical direction;

a pair of brake shoes provided in the gap between the guide members, arranged symmetrically with respect to the rail, capable of moving vertically along the inner surfaces of the guide members, and having braking faces opposing each other; and a pair of pulling means attached to the brake shoes, respectively, for pulling upward the brake shoes along the guide members, in the case of emergency, to cause the elastic members to press the guide members so that the brake shoes pinch the rail.

The brake shoe comprises (a) a brake body having a braking face and (b) a plurality of braking pieces embedded in the braking face side of the brake body to be projected from the braking face. The projection of each of the braking pieces forms a column or a multi-cornered pole having rounded corners. Each of braking pieces is made of a composite material containing a ceramic base material selected from the group consisting of silicon nitride, silicon carbide and sialon, and particles of at least one ceramic material selected from the group consisting of a carbide, a nitride and a boride. The ceramic particles have particle size in the range of 10 to 150 $\mu$m and dispersed into the ceramic base material.

Further, according to the present invention there is provided an elevator with an emergency stop function comprising:

a cage;

an elevating means for elevating the cage;

an elastic member having a U shape, capable of opening in a horizontal direction and attached to the bottom part of the cage by a supporting means;

a pair of guide members opposing each other and having outer surfaces contacting the end of the elastic member, respectively, and inner surfaces inclining such that a gap between the guide members gradually decreases toward the upper ends of the guide member;

a rail having a T-shaped cross section, positioned between the guide members and extending in a vertical direction;

a pair of brake shoes provided in the gap between the guide members, arranged symmetrically with respect to the rail, capable of moving vertically along the inner surfaces of the guide members, and having braking faces opposing each other; and a pair of pulling means attached to the brake shoes, respectively, for pulling upward the brake shoes along the guide members, at the time when the cage falls due to the breakdown of the elevating means, to cause the elastic member to press the guide members so that the brake shoes pinch the rail.

The brake shoe comprises (a) a brake body having a braking face and (b) a plurality of braking pieces embedded in the braking face side of the brake body to be projected from the braking face. The projection of each of braking piece forms of a column or a multi-cornered pole having rounded corners. Each of braking pieces is made of a composite material containing a ceramic base material selected from the group consisting of silicon nitride, silicon carbide and sialon, and particles of at least one ceramic material selected from the group consisting of a carbide, a nitride and a boride. The ceramic particles have particle size in the range of 10 to 150 $\mu$m and disposed into the ceramic based material.

Further, according to the present invention there is provided a device for elevator emergency stop comprising:

an elastic member having a U shape, capable of opening in a horizontal direction;

a pair of guide members opposing each other and having outer surfaces contacting the end of the elastic member, respectively, and inner surfaces inclining such that a gap between the guide members gradually decreases toward the upper ends of the guide member;

a rail having a T-shaped cross section, positioned between the guide members and extending in a vertical direction;

a pair of brake shoes provided in the gap between the guide members, arranged symmetrically with respect to the rail, capable of moving vertically along the inner surfaces of the guide members, and having braking faces opposing each other; and a pair of pulling means attached to the brake shoes, respectively, for pulling upward the brake shoes along the guide members, in the case of emergency, to cause the elastic member to press the guide members so that the brake shoes pinch the rail, wherein the elastic member has an elastic force for pressing the guide members, which becomes larger as the upper portion of each of the guide members.

Still further, according to the present invention there is provided an elevator with an emergency stop function, comprising:

a cage;

an elevating means for elevating the cage;

an elastic member having a U shape, capable of opening in a horizontal direction and attached to the bottom part of the cage by a supporting means;

a pair of guide members opposing each other and having outer surfaces contacting the end of the elastic member, respectively, and inner surfaces inclining such that a gap between the guide members gradually decreases toward the upper ends of the guide member;

a rail having a T-shaped cross section, positioned between the guide members and extending in a vertical direction;

a pair of brake shoes provided in the gap between the guide members, arranged symmetrically with respect to the rail, capable of moving vertically along the inner surfaces of the guide members, and having braking faces opposing each other; and a pair of pulling means attached to the brake shoes, respectively, for pulling upward the brake shoes along the guide members, at the time when the cage falls due to the breakdown of the elevating means, to cause the elastic member to press the guide members so that the brake shoes pinch the rail, wherein the elastic member has an elastic force for pressing the guide members, which becomes larger as the upper portion of each of guide members.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5A is a cross-sectional view of a braking piece to be incorporated into the brake shoe of the device for emergency stop of FIG. 3;

FIG. 5B is a front view of the braking piece of FIG. 5A;

FIG. 6A is a cross-sectional view of another braking piece to be incorporated into the brake shoe of the device for emergency stop of FIG. 3;

FIG. 6B is a front view of the braking piece of FIG. 6A;

FIG. 9A is a front view of a brake shoe to be incorporated into the device for emergency stop of FIG. 8;

FIG. 9B is a cross-sectional view taken through reference line IXB—IXB of FIG. 9A;

FIG. 10A is a front view of another brake shoe to be incorporated into the device for emergency stop of FIG. 8;

FIG. 10B is a cross-sectional view taken through reference line XB—XB of FIG. 10A;

FIG. 11A is a front view of yet another brake shoe to be incorporated into the device for emergency stop of FIG. 8;

FIG. 11B is a cross-sectional view taken through reference line XIB—XIB of FIG. 11A;

FIG. 12A is a front view of yet another brake shoe to be incorporated into the device for emergency stop of FIG. 8;

FIG. 12B is a cross-sectional view taken through reference line XIIB—XIIB of FIG. 12A;

FIG. 13A is a cross-sectional view of a braking piece to be incorporated into the brake shoe of the device for emergency stop of FIG. 8.

FIG. 13B is a front view of the braking piece of FIG. 13A;

FIG. 14A is a cross-sectional view of another braking piece to be incorporated into the brake shoe of the device for emergency stop of FIG. 8;

FIG. 14B is a front view of the braking piece of FIG. 14A;

FIG. 15 is a cross-sectional view illustrating the state of emergency of another device for elevator emergency stop of the present invention;

FIG. 22 shows the relative wear amounts after test of pin-like test pieces comprising composite materials for braking piece of Example 58 of the present invention and of Comparative Example 19, respectively;

FIG. 23A is a front view of test member employed in Examples 66 to 94;

FIG. 23B is a cross-sectional view taken through reference line XXIIIB—XXIIIB of FIG. 23A;

FIG. 26 gives characteristic curves showing the change in the coefficient of friction of composite materials for braking piece of Examples 95 and 96 of the present invention and of Comparative Example 19, respectively, in the period from the start of friction to stop; and FIG. 27 shows the relative wear amounts after test of pin-like test pieces comprising composite materials for braking piece of Examples 95 and 96 of the present invention and of Comparative Example 19, respectively.

DETAILED DESCRIPTION OF THE INVENTION

Referring to FIGS. 1 to 4, an elevator with a device for emergency stop of the present invention is explained in detail below.

Figures 1, 2:
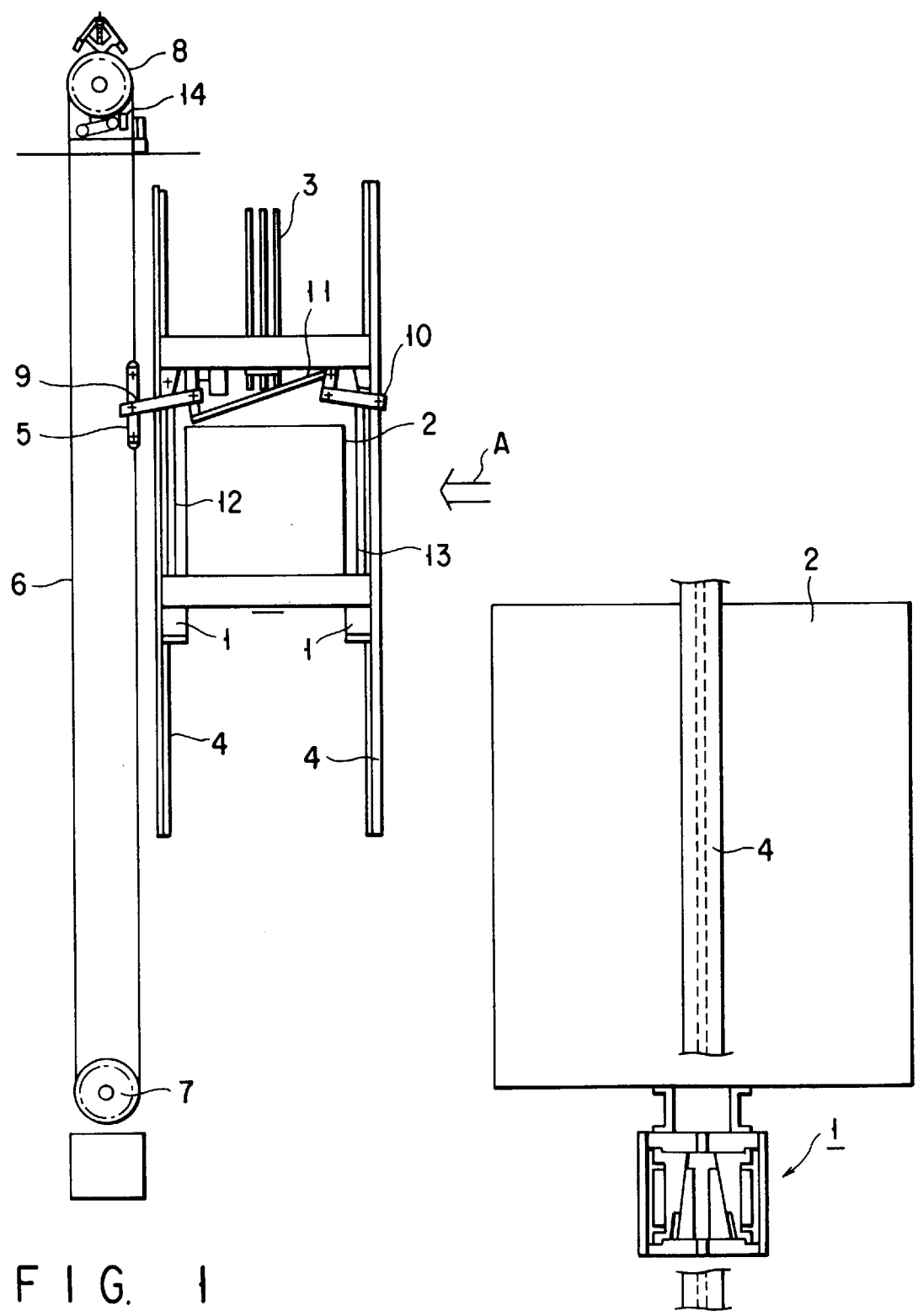
FIG. 1 is a schematic diagram of an elevator with a device for emergency stop of the present invention.
FIG. 2 is a view in the direction of the arrow A of the elevator of FIG. 1.
Figure 3:
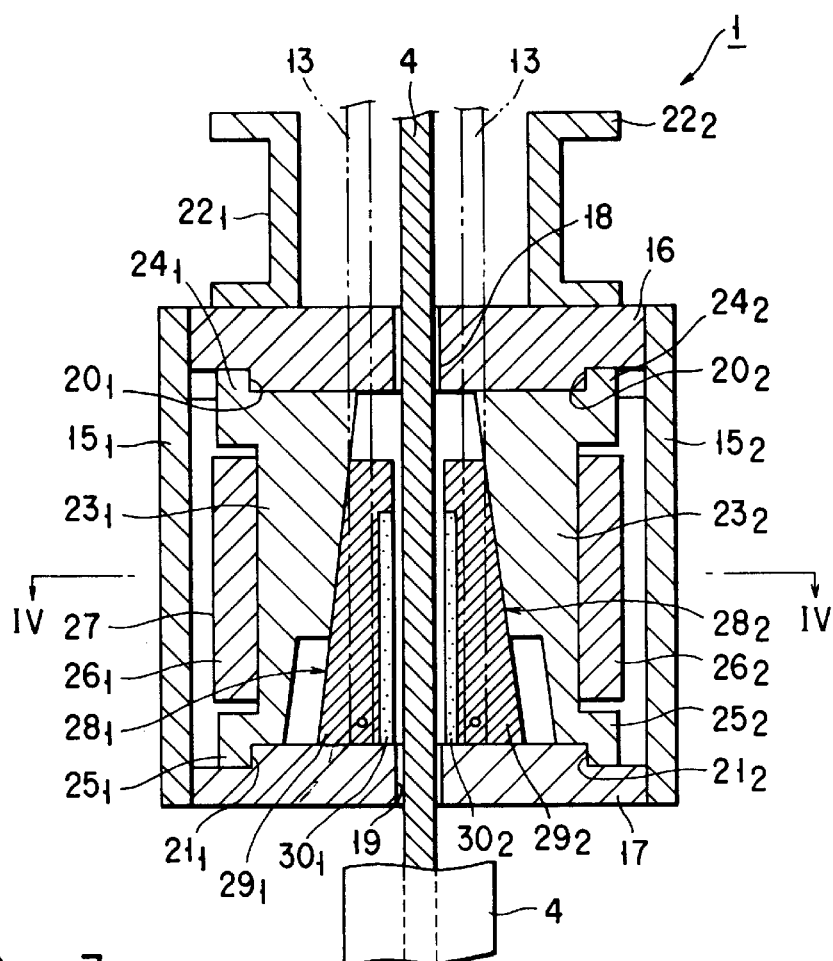
FIG. 3 is a cross-sectional view of the device for emergency stop of the elevator of FIG. 1.
Figure 4:
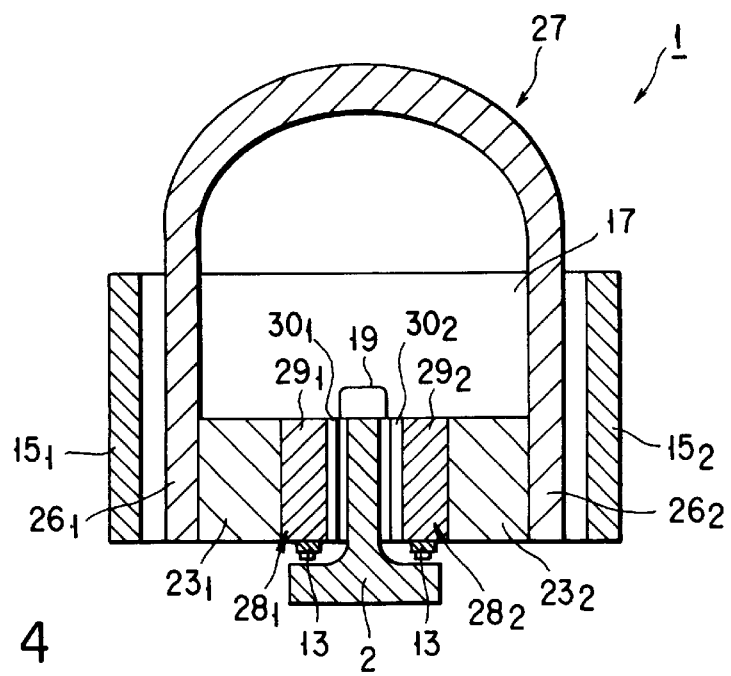
FIG. 4 is a cross-sectional view taken through reference line IV—IV of FIG. 3.

FIG. 1 is a schematic diagram of an elevator provided with a device for emergency stop, FIG. 2 is a view in the direction of the arrow A of the elevator of FIG. 1, FIG. 3 is a cross-sectional view of the device for emergency stop of the elevator of FIG. 1, and FIG. 4 is a cross-sectional view taken through reference line IV—IV of FIG. 3.

A pair of devices for emergency stop 1 are arranged symmetrically with respect to the right and left bottom parts of a cage 2, respectively. Ropes 3 of an elevating member (not shown) are attached to the upper plate of the cage 2. A pair of rails 4 are positioned along the side of the cage 2, which is provided with the pair of devices for emergency stop 1, in the direction of vertical direction.

A speed adjuster rope 6 having an engaging member 5, which faces the side of the cage 2 and attached to the rope 6, is movably supported between a pulley 7 of under floor and a speed adjuster 8 to be placed on the roof or the like. A first lever 9 is engaged with the engaging member 5. A second lever 10, whose end is positioned on the right side of the cage 2, is linked to the first lever 9 via a long lever 11. Two pulling wires 12 have the top ends linked to the first lever 9. The lower ends of the pulling wires 12 are attached to a brake shoe, which will be described hereinbelow, of the device for emergency stop 1 attached to the left bottom part of the cage 2. The lower ends of the pulling wires 13 are attached to a brake shoe, which will be described hereinbelow, of the device for emergency stop 1 attached to the right bottom part of the cage 2. A gripping member 14 is positioned in the neighborhood of the speed adjuster 8.

If the speed adjuster 8 detects that the descending seed of the rope 6, which is linked to the cage 2 via the levers 9 and 10, exceeds a preset speed because of the fall of the cage 2 as a result of the severance of the rope 3 due to a trouble of the elevator (not shown), the detecting signal is transmitted to the gripping member 14 to cause it to grip the speed adjuster rope 6. When the speed adjuster rope 6 is gripped in the above-described way, the first lever 9 engaged with the engaging member 5 and the second lever 10 engaged with the first lever 9 via the long lever 11, which is secured to a position midway within the length of the rope, pull the pulling wires 12 and 13 to thereby pull upward a pair of brake shoes of the device for emergency stop 1 which will be described hereinbelow. The speed adjuster rope 6 having the engaging member 5, the pulley 7, the speed adjuster 8, the first and second levers 9 and 10, the long lever 11, the pulling wires 12 and 13, and the gripping member 14, all combined together, constitute a pulling means.

As shown in FIGS. 2 to 4, the device for emergency stop 1 has an upper stopper plate 16 and lower stopper plate 17 which are fixed by a pair of supporting plates $15_1$ and $15_2$ facing each other. In the central part of the front surface of the stopper plates 16 and 17 are formed narrow and long grooves 18 and 19. The projections of the T-shaped rail 4 are fitted through the grooves 18 and 19. The under parts of both ends of the upper stopper plate 16 on the side of the supporting plates $15_1$ and $15_2$ are formed cutaway parts $20_1$ and $20_2$, respectively. The upper parts of both ends of the lower stopper plate 17 on the side of the supporting plates $15_1$ and $15_2$ are formed cutaway parts $21_1$ and $21_2$, respectively. Two beams $22_1$ and $22_2$ each have upper part and lower part outwardly right-angled, respectively, so that the upper part is linked to the bottom surface of the cage 2 while the lower part is linked to the upper surface of the upper stopper plate 16.

A pair of guide members $23_1$ and $23_2$, which are each in the form of an inverse trapezoidal block, face each other and arrange within the space defined by the supporting plates $15_1$ and $15_2$ and the upper and the lower stopper plate 16 and 17. Inner surfaces of the guide members $23_1$ and $23_2$ incline such that a gap between the guide members $23_1$, and $23_2$ gradually decreases toward the upper ends of the guide members $23_1$ and $23_2$. The guide members $23_1$ and $23_2$ have projections $24_1$ and $25_1$ as well as $24_2$ and $25_2$ at upper ends as well as at lower ends, respectively, on the side facing the supporting plates $15_1$ and $15_2$. The projections $24_1$ and $25_1$ as well as $24_2$ and $25_2$ engage with the cutaway parts $20_1$ and $20_2$, as well as with the cutaway parts $21_1$ and $21_2$, respectively, of the upper stopper plate 16 and of the lower stopper plate 17. This engagement allows the guide members $23_1$ and $23_2$ to be positioned slidably on the under surface of the upper stopper plate 16 and on the upper surface of the lower stopper plate 17. An elastic member 27, which has a U-shaped top and ends $26_1$ and $26_2$, each capable of opening, is inserted in such a manner that the inner surface in the neighborhood of the ends $26_1$ and $26_2$ abuts against the outer surfaces of the guide members $23_1$ and $23_2$ within the aforementioned space. The insertion of the elastic member 27 allows the elastic force of the ends $26_1$ and $26_2$ to act on the pair of guide members $23_1$ and $23_2$, thereby bringing the guide members $23_1$ and $23_2$ closer to each other. However, the guide members $23_1$ and $23_2$ cannot approach each other beyond a predetermined space therebetween because of the presence of the rising wall of the cutaway parts $20_1$ and $20_2$ as well as of the cutaway parts $21_1$ and $21_2$. Besides, because of the position of the guide members $23_1$ and $23_2$, a space in a shape similar to an inverse V letter is formed therebetween.

A pair of brake shoes $28_1$ and $28_2$ face each other between the guide members $23_1$ and $23_2$, and the under part of the brake shoes $28_1$ and $28_2$ are superposed on the lower stopper plate 17. The brake shoes $28_1$ and $28_2$ consist of a brake body $29_1$ and $29_2$, which are each in the form of a vertically extending square trapezoidal pole having a braking face, and braking pieces $30_1$ and $30_2$ which are each in the form of a narrow long plate and are embedded in the braking face side of the brake bodies $29_1$ and $29_2$. The brake shoes $28_1$ and $28_2$ are capable of moving vertically along the inner surfaces of the guide members $23_1$ and $23_2$. Besides, a projected portion of the rail 4, which extends vertically and has a T-shaped cross section, is positioned between the brake shoes $28_1$ and $28_2$. The two pulling wires 13 are attached to the lower part of the front surface of the brake shoes $28_1$ and $28_2$, respectively.

The brake bodies $29_1$ and $29_2$ are made of a material such as mild steel or cast iron.

The braking pieces $30_1$ and $30_2$ are made of the following materials and have the following constructions.

(1-1) Braking Piece

The braking piece is made of a composite material containing a ceramic base material selected from the group consisting of silicon nitride, titanium boride, sialon and silicon carbide, and no less than 10 wt % of a ceramic material selected from the group consisting of a silicon carbide whisker and a silicon carbide platelet.

The amount of the ceramic material is specified as stated above, because where the amount of the ceramic material is less than 10 wt %, a higher level of the coefficient of friction and the prevention of the change with time of the coefficient of friction will not be achieved, in comparison with the case of the neat ceramic base material. The upper limit of the amount of the ceramic material is preferably 40 wt % which will not impair the compactness of the braking piece.

The silicon carbide whisker (needle-like) or silicon carbide platelet (plate-like) may be included alone in the ceramic base material. However, from the viewpoint of enhancing the coefficient of friction of the braking piece, a composite material containing both of silicon carbide whisker and silicon carbide platelet having different shapes is preferably employed.

(1-2) Braking Piece

The braking piece is made of a composite material containing a ceramic base material selected from the group consisting of silicon nitride, titanium boride, sialon and silicon carbide, and a ceramic material selected from the group consisting of a silicon carbide whisker and a silicon carbide platelet, and at least one continuous fiber selected from the group consisting of silicon carbide, silicon nitride, carbon and tungsten. The amount of the ceramic material in the braking piece is no less than 10 wt %. In addition, the amount of the continuous fiber in the braking piece is 10 to 55 vol %.

The continuous fibers preferably have a diameter in the range of 10 to 150 μm. However, the length of the continuous fibers may be chosen at will depending on the size of the braking piece.

The amount of the continuous fibers is defined in the above range for the reasons explained below. If the amount of the continuous fibers in the braking piece is less than 10 vol %, the enhancement of the coefficient of friction and the prevention of the change with time of the coefficient of friction become difficult. On the other hand, if the amount of the continuous fibers in the braking piece exceeds 55 vol %, the strength of the ceramic base material is undesirably reduced, and the ceramic base material of the braking piece may crack when the brake shoes, come into a sliding contact with a rail. Most preferably, the amount of the continuous fibers is 15 to 30 vol % in the braking piece.

(1-3) Braking Piece

As shown in FIGS. 5A and 5B, the braking piece $30_1$ ($30_2$) has a construction where a number of ceramic fibers 32 are embedded in a plate-like ceramic base material 31 in such a manner that the ceramic fibers are vertically disposed at the surface of the ceramic base material 31 (i.e., the surface constituting the braking face of the brake shoes $28_1$ and $28_2$ of FIG. 3 as previously mentioned) and exposed to the surface of the ceramic base material 31.

(1-4) Braking Piece

As shown in FIGS. 6A and 6B, the braking piece $30_1$ ($32_2$) has a construction where bundles 33 of ceramic fibers are embedded in a plate-like ceramic base material 31 in such a manner that the bundles of fibers are vertically disposed at the surface of the ceramic base material 31 (i.e., the surface constituting the braking face of the brake shoes $28_1$ and $28_2$ of FIG. 3 as previously mentioned) and exposed to the surface of the ceramic base material 31.

The ceramic base material to be used for the aforementioned braking piece (1-3) or (1-4) is comprised, for example, of silicon nitride, sialon or silicon carbide. Although the sialon may be α-sialon or β-sialon, preferably the sialon is β-sialon represented by $Si_{6-Z}Al_ZN_{8-Z}$ (0<Z≦4.2). Besides, the ceramic base material may be reinforced by embedding therein whiskers, platelets or continuous fibers made of such ceramics as silicon carbide.

The ceramic fibers to be used for the aforementioned braking piece (1-3) or (1-4) are comprised, for example, of silicon carbide.

Figure 7:
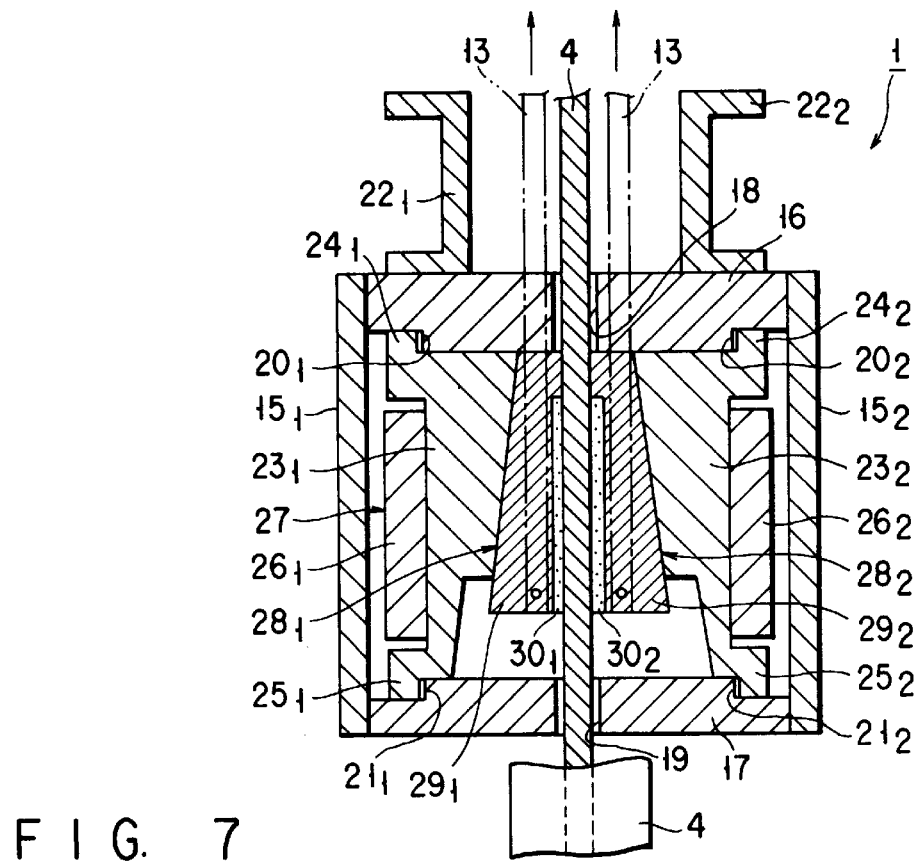
FIG. 7 is a cross-sectional view illustrating the state of emergency of the device for elevator emergency stop of FIG. 3.

Referring now to FIGS. 3 and 4 and also to FIG. 7, the function of the device for emergency stop incorporated into an elevator of FIGS. 1 and 2 is explained below.

As shown in FIGS. 3 and 4, while the elevator is operated in a normal way, the braking faces of a pair of brake shoes $28_1$ and $28_2$ are positioned holding a predetermined distance from the projected portion of the rail 4. Because of this positioning, the slowing down of the cage 2 by means of the device for elevator emergency stop is not effected.

Meanwhile, if the rope 3 of FIG. 1 is cut due to the trouble of the elevator, a so-called emergency state occurs where the cage 2, which will be elevated by the rope 3, will fall. As the cage 2 falls, the speed adjuster rope 6, which is linked to the cage 2 via the levers 9 and 10, also descend. When the speed adjuster 8 detects that the descending speed of the rope 6 exceeds a preset speed, the detecting signal is transmitted to the gripping member 14 to cause it to grip the speed adjuster rope 6. If the speed adjuster rope 6 is gripped in the above-described way, the first lever 9 and the second lever 10 each engaged with the engaging member 5, which is secured to a position midway within the length of the rope, pull the pulling wires 12 and 13. If the pulling wires 12 and 13 are pulled, as shown in FIG. 7, each of the brake shoes $28_1$ and $28_2$ of a pair of devices for emergency stop is pulled upward along the inclined inner surface of the guide members $23_1$ and $23_2$ resisting the elastic force that tends to bring the ends $26_1$ and $26_2$ closer to each other. As the brake shoes $28_1$ and $28_2$ are pulled upward, a force will be generated by which the braking surfaces pinch the projected portion of the rail 4 because the distance between the brake shoes becomes so small that the opposed surfaces (braking faces) contact the projected portion of the rail 4 and the counteraction of the elastic member 27 adds to the pinching force. Since braking parts $30_1$ and $30_2$ are formed in the braking face of the brake shoes $28_1$ and $28_2$, because of the pinching hold of the projected portion of the rail 4 by means of the brake shoes $28_1$ and $28_2$, a frictional force will be generated between the braking pieces $30_1$ and $30_2$ and the projected portion of the rail 4, which will slow down and stop the falling cage 2.

It is possible to provide a braking piece which has a heat resistance to a temperature that exceeds 1000° C. as well as a stabilized high coefficient of friction and an excellent seizure-resistance to rails and to inhibit the change with time of the coefficient of friction by forming the braking pieces $30_1$ and $30_2$, which come into a sliding contact with the rail 4 in the process of slowing down and stop of the cage 2 by means of the device for elevator emergency stop 1, with a composite material containing a ceramic base material selected from the group consisting of silicon nitride, titanium boride, sialon and silicon carbide, and no less than 10 wt % of a ceramic material selected from the group consisting of a silicon carbide whisker and a silicon carbide platelet, as explained in (1-1).

That is, if a braking piece is formed with a neat ceramic material, the sliding between the ceramic material and the projected portion of the rail improves the compatibility between the ceramic material and the material of the rail to such an extent that a sort of lubricating effect emerges. On the contrary, by forming the braking piece with a composite material containing a ceramic base material with a silicon carbide whisker or a silicon carbide platelet, which has a very high anisotropy unlike the ceramic base material, as illustrated in the present invention, it is possible to provide a braking piece which has a heat resistance to a temperature that exceeds 1000° C. as well as a stabilized high coefficient of friction and an excellent seizure-resistance to rails, to prevent the development of a lubricating effect between the rail and the sliding face of the braking piece and to inhibit the change with time of the coefficient of friction. As a result, the device for elevator emergency stop 1, which is provided with the brake shoes $28_1$ and $28_2$ having the braking pieces $30_1$ and $30_2$ as described in (1-1), can surely slow down and stop the falling cage 2 in the case of emergency where the rope 3 is cut due to the trouble of the elevator.

Further, it is possible to provide a braking piece which has a heat resistance to a temperature that exceeds 1000° C. and an excellent seizure-resistance to rails and to reinforce the ceramic base material with the continuous fibers as explained in (1-2). As a result, the device for elevator emergency stop 1, which is provided with the brake shoes $28_1$ and $28_2$ having the braking pieces $30_1$ and $30_2$ as described hereinabove, can surely slow down and stop the falling cage 2 in the case of emergency where the rope 3 is cut due to the trouble of the elevator, without developing crack in the ceramic base material of the braking pieces $30_1$ and $30_2$ which comes into a sliding contact with the rail 4.

Still further, as shown in FIGS. 5A and 5B, the braking pieces $30_1$ and $32_2$ have a construction where ceramic fibers 32 are vertically embedded in a plate-like ceramic base material 31 in such a manner that the ceramic fibers are exposed to the surface of the ceramic base material 31. By use of such a construction, it is possible to provide a braking piece which has a heat resistance to a temperature that exceeds 1000° C. and an excellent seizure-resistance to rails and to maintain a stabilized friction property. Because a number of ceramic fibers of very small diameter exposed to the surface exhibit the same effect as embedded hard particles. Therefore, the rail is not damaged unlike the case where the detached hard particles damage the rail. Particularly, as shown in FIGS. 6A and 6B, the braking pieces $30_1$ and $32_2$, which have a construction where bundles 33 of ceramic fibers are vertically embedded in a plate-like ceramic base material 31 in such a manner that the bundles of fibers are exposed to the surface of the ceramic base material 31 as explained in (1-4), do not damage the rail and exhibit a more stabilized friction/wear property. Accordingly, the device for elevator emergency stop 1, which is provided with the brake shoes $28_1$ and $28_2$ having the braking pieces $30_1$ and $30_2$ as described hereinabove, can surely slow down and stop the falling cage 2 in the case of emergency where the rope 3 is cut due to the trouble of the elevator.

The brake shoes (1-1) to (1-4) described above have high toughness and high coefficient of friction. They therefore exhibit as much braking property as the conventional brake shoes even if the elastic member exerts a relatively small force on them. Hence, the elastic member can be made smaller, and the elevator emergency stop 1 can be manufactured at low cost.

Figure 8:
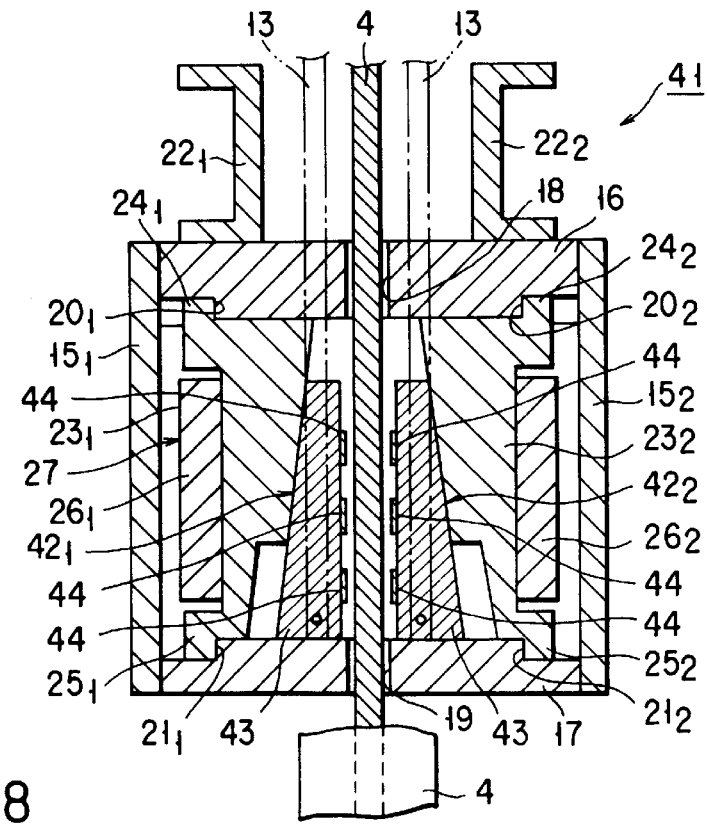
FIG. 8 is a cross-sectional view of another device for elevator emergency stop of the present invention.

Referring now to FIG. 8, another device for emergency stop to be incorporated into an elevator of FIGS. 1 and 2 is explained in detail below. In the following description, the same elements as those mentioned in FIG. 3 are given the same symbols and the explanation for them is omitted.

The device for emergency stop 41 of FIG. 8 has, between guide members $23_1$ and $23_2$, a pair of brake shoes $41_1$ and $42_2$ which face each other and the under part of which is superposed on the lower stopper plate 17. The brake shoes $41_1$ and $42_2$ each comprise a brake body 43 having a braking face and a plurality of braking pieces 44 which are embedded in the braking face of the body 43 in such a manner that the braking pieces 44 project from the braking face of the brake body. The projection of each of the braking pieces is in the form of a column or a multi-cornered pole having rounded corners.

The brake body 43 is made of, for example, a material such as mild steel or cast iron.

The brake shoes $42_1$ and $42_2$ have, for example, the following (2-1)–(2-4) constructions.

(2-1) Brake Shoe

As illustrated in FIGS. 9A and 9B, the brake shoe $42_1$ ($42_2$) comprises metal brake body 43 having a rectangular cavity 45 on a braking face side. The brake body 43 has three vertical lateral faces, including the braking face, in a form of a square trapezoid. A rectangular metal supporting block 47, which has plural, for example 6, column-like through holes 46, is embedded in the cavity 45 of the body 43 via a heat resistant fibrous sheet 48 as a sheet-like buffering material. The supporting block 47 is fixed to the body 43 by means of a screw 49. Plural, for example 6, column-like braking pieces 44, are inserted into the through holes 46 of the supporting block 47 via a cylindrical body 50 of a heat resistant long fiber in such a manner that the braking pieces 44 project from the surface of the supporting block 47. The braking pieces 44 together with the cylindrical bodies 50 are fixed inside the through holes 46 by means of an adhesive. The grooves of grid are formed in the front surface (braking face) of the braking pieces 44.

The brake body 43 and the supporting block 47 are made of, for example, a metal such as a stainless steel or a heat resistant alloy.

The braking piece 44 are made of a composite material containing a ceramic base material selected from the group consisting of silicon nitride, silicon carbide and sialon, and particles of at least one ceramic material selected from the group consisting of a carbide, such as titanium carbide or tungsten carbide, a nitride, such as a titanium nitride, and a boride, such as titanium boride. The ceramic particles have an average particle size in the range of 10 to 150 $\mu$m and dispersed into the ceramic base material.

Although the ceramic particles may be dispersed throughout the braking piece, preferably the ceramic particles are dispersed in the surface layer including the surface (braking face) of the braking piece. In such a braking piece, which has a surface layer made of a ceramic base material having ceramic particles dispersed therein, the surface (braking face) has a high coefficient of friction and an excellent impact resistance. When dispersing the ceramic particles in the surface layer, preferably the ceramic particles are dispersed in the surface layer having a depth of 30% or less of the total thickness from the surface. If such surface layer thickness exceeds 30% of the total thickness of the braking piece, the braking piece may be broken by the impact generated at the time of slowing down and stop. The minimal thickness of the surface layer is preferably 1% of the total thickness of the braking piece, because the surface layer will be easily peeled if the thickness of the surface layer is less than the depth of the grid-like grooves.

The amount of the ceramic particles dispersed into the ceramic base material is preferably in the range of from 5 to 30 wt %. Besides, in the case where the ceramic particles are dispersed in the surface layer of the braking piece, the amount of the ceramic particles is preferably in the range of from 5 to 30 wt % in the layer of the ceramic base material.

The average is defined in the above range for the reasons explained below. If the average particle size is less than 10 $\mu$m, it will be difficult to obtain the braking piece having a high coefficient of friction. On the other hand, if the average particle size exceeds 150 $\mu$m, the uniform dispersion of the ceramic particles is difficult and the strength of the braking piece 44 will be reduced. Most preferably, the average particle size is in the range of 40 to 80 $\mu$m.

In the above-mentioned braking piece 44, the ceramic base material such as silicon nitride may be further incorporated with a heat resistant fiber, such as silicon carbide fiber, tungsten fiber or carbon fiber, or with a short fiber such as silicon carbide whisker.

The projected height of each of braking piece 44 from the supporting block 47 is preferably 0.5 to 2 mm. If projected height of each braking piece 44 from the supporting block 47 is less than 0.5 mm, it will be difficult to fully exhibit the braking action to the rail at the time of slowing down and stop. On the other hand, if projected height exceeds 2 mm, the braking piece may be broken by the impact at the time of slowing down and stop.

In the braking piece 44, the ratio of maximal length (L) to the thickness (T), i.e., (L/T), is preferably in the range of 0.5 to 10. Such a braking piece 44 will be capable of preventing more effectively the fracture by impact at the time of slowing down and stop.

The groove in the form of a grid to be formed on the surface (braking face) of each of the braking pieces 44 preferably has a depth of 0.1 to 0.5 mm and the grid preferably has a pitch of 0.5 to 5 mm. If the depth of the groove is less than 0.1 mm and the pitch of the grid is more than 5 mm, it will be difficult to impart a sufficient enhancement of the coefficient of friction to the surface (braking face) of each of the braking pieces 44 by the formation of the grid. On the other hand, if the depth of the groove is more than 0.5 mm and the pitch of the grid is less than 0.5 mm, the impact resistance of each of the braking pieces 44 may be reduced.

Examples of the heat resistant long fiber, which constitutes the sheet 48 and the cylindrical body 50, include a two-dimensional fiber of silicon carbide or carbon.

(2-2) Brake Shoe

As illustrated in FIGS. 10A and 10B, the brake shoe $42_1$ ($42_2$) has a metal brake body 43 having a rectangular cavity 45 on the braking face side. The metal brake body 43 has three vertical lateral faces, including the braking face, in a form of a square trapezoid. A rectangular metal supporting block 47 is embedded in the cavity 45 of the body 43. The supporting block 47 has plural, for example 6, column-like holes 51. The portion of the supporting block 47, which forms the bottom of the holes 51, has small holes 52 which will hold screws that will be described hereinbelow. Metal screws 54 run the brake body 43 through the small holls 52 of the supporting block 47, respectively, so that the supporting block 47 is fixed to the body 43. Plural, for example 6, cylindrical bodies 53, which have a bottom and made of a heat resistant long fiber, are inserted into each of the column-like holes 52 of the body 43. Plural, for example 6, column-like braking pieces 44 are respectively inserted into the cylindrical bodies 53 having a bottom inside the holes 54 of the supporting block 47 in such a manner that the braking pieces project from the surface of the supporting block 47. The grid-like grooves are formed on the front surface (braking face) of each of the braking pieces 44.

The body 43 and the supporting block 47 are made of the same metal as in the case of (2-1).

The construction of each of the braking pieces 44 is the same as in the case of (2-1).

The projected height of each braking pieces 44 from the supporting block 47 is preferably 0.5 to 2 mm because of the same reason as in the case of (2-1).

The groove in the form of a grid to be formed on the surface (braking face) of each of the braking pieces 44 preferably has a depth of 0.1 to 0.5 mm and the grid preferably has a pitch of 0.5 to 5 mm because of the same reason as in the case of (2-1).

Examples of the heat resistant long fiber, which constitutes the cylindrical body 53 having a bottom, include a silicon carbide long fiber.

(2-3) Brake Shoe

As illustrated in FIGS. 11A and 11B, the brake shoe $42_1$ ($42_2$) has a metal brake body 43 having a rectangular cavity 45 on the braking face side. The metal brake body 43 has three vertical lateral faces, including the braking face, in a form of a square trapezoid. A rectangular metal supporting block 47 is embedded in the cavity 45 of the body 43. The supporting block 47 is fixed to the body 43 by means of a screw 49. The supporting block 47 has plural, for example 6, column-like holes 52, which communicate with each other by means of a flow passageway 55. A disk-like metal plate 56 is fixed to the middle of the column-like hole 52 of the supporting block by means of an adhesive. A liquid, for example an oil 57 for hydraulic equipment, is accommodated in the column-like hole 52 and in the flow passageway 55 opposite to the braking face, utilizing the metal plate 56 as a boundary. That is, the metal plate 56 is used in order to seal the oil 57 into the column-like hole 52 and the flow passageway 55. Plural, for example 6, column-like braking pieces 44 are each inserted into the holes 52 of the supporting block 47 in such a manner that the braking pieces 44 project from the surface of the supporting block 47. The braking pieces 44 are each fixed inside the hole 52 by means of an adhesive. The grooves of grid are formed in the front surface (braking face) of the braking pieces 44.

The body 43 and the supporting block 47 are made of the same metal as in the case of (2-1).

The construction of each of the braking pieces 44 is the same as in the case of (2-1).

The projected height of each braking pieces 44 from the supporting block 47 is preferably 0.5 to 2 mm because of the same reason as in the case of (2-1).

The groove in the form of a grid to be formed on the surface (braking face) of each of the braking pieces 44 preferably has a depth of 0.1 to 0.5 mm, and the grid preferably has a pitch of 0.5 to 5 mm because of the same reason as in the case of (2-1).

(2-4) Brake Shoe

As illustrated in FIGS. 12A and 12B, the brake shoe $42_1$ ($42_2$) has a metal brake body 43 having a rectangular cavity 45 on the braking face side. The metal brake body 43 has three vertical lateral faces, including the braking face, in a form of a square trapezoid. A rectangular metal supporting block 47, which has plural, for example 5, conical trapezoid holes 58, is embedded in the cavity 45 of the body 43 via a heat resistant long-fiber sheet 48. Meanwhile, braking pieces 59 in the form of a conical trapezoid, are each inserted into the conical trapezoid holes 58 from the back of the supporting block 47 via a conical cylinder body 60 made of a heat resistant long fiber. The supporting block 47 is fixed to the body 43 by means of a screw 49. As a result of the fixation of the supporting block 47 in the above-described way, each of the braking pieces 59 projects from the surface of the supporting block 47 by a desired length. The grooves of grid are formed in the front surface (braking face) of the braking pieces 59.

The body 43 and the supporting block 47 are made of the same metal as in the case of (2-1).

The construction of each of the braking pieces 59 is the same as in the case of (2-1).

The projected height of each braking piece 59 from the supporting block 47 is preferably 0.5 to 2 mm because of the same reason as in the case of (2-1).

The groove in the form of a grid to be formed on the surface (braking face) of each of the braking pieces 59 preferably has a depth of 0.1 to 0.5 mm and the grid preferably has a pitch of 0.5 to 5 mm because of the same reason as in the case of (2-1).

Examples of the heat resistant long fiber, which constitutes the sheet 48 and the conical cylinder body 60, include a silicon carbide long fiber.

In the case of the brake shoes (2-1)–(2-3), the braking piece may be in the form of a cornered-pole such as 3-cornered, square, 5-cornered or 6-cornered pole having the corner rounded.

In the case of the brake shoes (2-4), the braking piece may be in the form of a cornered-cone such as 3-cornered, square, 5-cornered or 6-cornered cone having the corner rounded.

In the case of the brake shoes (2-1), (2-2) and (2-4), a heat resistant long fiber constituting a buffering material may be placed only on the back side of the braking piece.

Further, in the case of the brake shoes (2-4), the braking piece in the form of a conical trapezoid may take a construction where screw threads are formed on the bottom part as illustrated in FIG. 11A and 11B or a construction where a metal supporting block contains a liquid.

Still further, in the case of the brake shoes (2-1)–(2-3), the braking piece may take a construction where a number of pyramid-shaped projections 61 are arranged in the front face (braking face) as illustrated in FIGS. 13A and 13B or a construction where a number of semi-cylindrical projections 62 are arranged in a right angle to the direction of slide on the rail. Also in the braking piece to be used for the brake shoe (2-4), a construction may be taken where a number of pyramid-shaped or semi-cylindrical projections are arranged in the front surface (braking face).

The height of the projection is preferably no greater than 1 mm. If the height of the projection exceeds 1 mm, a brake shoe having such projections is brought into a sliding contact with a rail at the time of slowing down and stop, the root of the projection may be fractured and the projection may be detached. Most preferably, the height of the projection is in the range of 0.2 to 0.5 mm.

Referring now to FIGS. 8 and 15, the function of a device for emergency stop, which is incorporated into the elevator of FIGS. 1 and 2, is explained below.

While the elevator is operated in a normal way, the opposed surfaces of a pair of brake shoes $42_1$ and $42_2$ are positioned with a certain distance from the projected part of the rail 4. Accordingly, the device for elevator emergency stop 41 does not function to slow down and stop the cage 2.

Meanwhile, if the rope 3 of FIG. 1 is cut due to trouble of the elevator, an emergency happens to cause the cage 2 elevated or lowered by the rope 3 to fall. As the cage 2 falls, the speed adjuster rope, which is linked to the cage via the levers 9 and 10, also descends. If the speed adjuster 8 detects that the descending speed of the rope 6 exceeds a preset speed, the detecting signal is transmitted to the gripping member 14 to cause it to grip the speed adjuster rope 6. If the speed adjuster rope 6 is gripped in the above-described way, the first lever 9 and the second lever 10 each engaged with the engaging member 5, which is secured to a position midway within the length of the rope, pull the pulling wires 12 and 13. If the pulling wires 12 and 13 are pulled, this action will cause a pair of brake shoes shoe $42_1$ and $42_2$ of the device for emergency stop 41 as shown in FIG. 15 to be pulled upward along the inclined surface of the guide members $23_1$ and $23_2$ resisting the elastic force that tends to bring the ends $26_1$ and $26_2$ closer to each other. As the brake shoes $42_1$ and $42_2$ are pulled upward, a force will be generated by which the braking faces pinch the projected portion of the rail 4 because the distance between the brake shoes becomes so small that the opposed surfaces (braking faces) contact the projected portion of the rail 4 and the counteraction of the elastic member 27 adds to the pinching force. Since a plurality of braking pieces 44 project from the braking face of the brake shoes $42_1$ and $42_2$, the pinching hold of the projected portion by means of the brake shoes $42_1$ and $42_2$ will create a frictional force so that the falling cage 2 will slow down and stop.

The brake shoes $42_1$ and $42_2$, which are brought into a sliding contact with the rail in the process of slowing down and stopping of the cage 2 by means of the device for elevator emergency stop 41, are constructed such that a plurality of column-like braking pieces 44 project from the surface of the supporting block 43 via a metal supporting block 47 on the braking face side of the brake body 43, as illustrated in FIGS. 9A and 9B in previous section (2-1). Each of the braking pieces 44 is made of a composite material containing a ceramic base material selected from the group consisting of silicon nitride, silicon carbide and sialon, and particles of at least one ceramic material selected from the group consisting of a carbide, a nitride and a boride, which have particle sizes in the range of 10 to 150 $\mu$m, and are dispersed into the ceramic base material. Owing to this construction of the braking piece 44, it is possible to provide a braking piece which has a heat resistance to a temperature that exceeds 1000° C. as well as a stabilized high coefficient of friction at the projections under a condition of high speed and high stress and to prevent the fracture by impact at the time of slowing down and stop. Because of this, a sufficient braking action to rail can be exerted at the time of slowing down and stop.

That is, the braking piece 44, which is made of a composite material contacting a ceramic base material such as silicon nitride and particles of ceramic material such as titanium carbide deposed into the ceramic base material, makes it possible to exhibit a heat resistance to a temperature that exceeds 1000° C. as well as a stabilized high coefficient of friction under a condition of high speed and high stress at the time when a slide takes place between the projected portion of rail and the braking piece. Particularly, if the ceramic particles are dispersed in the surface layer (e.g., the surface layer having a depth up to 30% of the total thickness) in the composite material, the surface (braking face) of the braking piece has a high coefficient of friction and an excellent impact resistance. Besides, since the braking pieces 44 each have a shape of a column and are each independently secured to the body 43 by means of the supporting block 47, it is possible to relax the stress concentration for the prevention of the fracture such as cracking and to limit the cracking to a constituent member of the braking pieces 44. As a result, the device for elevator emergency stop 41, which is provided with the brake shoes $42_1$ and $42_2$ described in (2-1), can surely slow down and stop the falling cage 2 in an emergency where the rope is cut due to the trouble of elevator, because the braking pieces 44 have a high coefficient of friction and a high cracking resistance due to a plurality of members constituting the braking pieces 44.

Further, the fracture of the braking pieces 44 can be more surely prevented, if a sheet 48 or a cylindrical body 50, which is made of a heat resistant long fiber such as a two-dimensional fiber of silicon carbide, is provided to the braking piece 44 on the side facing the body 43 and the periphery of the braking piece, because the sheet 48 and the cylindrical body 50 can absorb the impact on the braking piece 44 at the time of slowing down and stop. As a result, the device for elevator emergency stop 41, which is provided with the brake shoes $42_1$ and $42_2$ prepared in the above-described manner, can more surely slow down and stop the falling cage 2 in an emergency where the rope is cut due to the trouble of elevator.

Further, it is possible to enhance the coefficient of friction and to effectively discharge the residue of friction product and the friction heat by adopting the construction of the braking piece 44 where the surface (braking face) of the braking piece 44 has a grid-shaped grooves having a depth of 0.1 to 0.5 mm and a pitch of 0.5 to 5 mm or has projections. As a result, the device for elevator emergency stop 41, which are provided with the brake shoes $42_1$ and $42_2$ in the above-described, can more surely slow down and stop the falling cage 2 in an emergency where the rope is cut due to the trouble of elevator.

The brake shoe $42_1$ ($42_2$), as illustrated in FIGS. 10A and 10B described in (2-2), has the same effect as mentioned in the above, and, in addition, can more effectively fix the braking pieces 44 by inserting into the cylindrical bodies 53 made of a heat resistant log fiber, respectively.

As illustrated in FIGS. 11A and 11B in (2-3), the brake shoe $42_1$ ($42_2$) has a construction where the supporting block 47 has plural column-like holes 52 and a passageway 55, which communicates with the holes, filled with a liquid, for example an oil 57 for hydraulic equipment, in such a manner that a metal plate 56 in the middle of the column-like hole 52 seals the liquid and the braking piece 44 is fixed inside the column-like hole 52 by means of an adhesive. Because of this construction, when the braking piece 44 and the rail 4 are brought into a sliding contact with each other, a pressing force applied to one of the braking pieces 44 serves as a force that presses other braking piece 44 to the projected portion of the rail via the liquid 57. In other words, it becomes possible to bring all of the braking pieces 44 of the supporting block 47 into a uniform sliding contact with the projected portion of the rail. As a result, all of the plural braking pieces 44 exert a braking action to the projected portion of the rail 4. Therefore, the device for elevator emergency stop 41, which is provided with the brake shoes $42_1$ and $42_2$ having a plurality of the braking pieces 44, can more surely slow down and stop the falling cage 2 in an emergency where the rope is cut due to the trouble of elevator.

The brake shoe $42_1$ ($42_2$), as illustrated in FIGS. 12A and 12B described in (2-4), has the same effect as mentioned in the above, and, in addition, can more surely prevent the ejection of the braking pieces 59 due to impact and the like, because a plurality of braking pieces 59 each in the form of a conical trapezoid are fixed to the body 43 by means of a rectangular metal supporting block 47 having conical trapezoid holes 58.

The brake shoes (2-1) to (2-3) described above have high toughness and high coefficient of friciton. They therefore exhibit as much braking property as the conventional brake shoes even if the elastic member exerts a relatively small force on them. Hence, the elastic member can be made smaller, and the elevator emergency stop 41 can be manufactured at low cost.

The coefficient of friction which the conventional brake shoes have with respect tot he rail is too low for the shoes to stop the elevator cage being moved up or down at 1250 m/min by the elevating means. To stop the cage moving at such a high speed, the elevator emergency stop needs to incorporate an elastic member which is shaped like a coil and which exerts a greater force than the above-mentioned U-shape leaf spring. However, a coil-shaped elastic member is larger and heavier than the leaf spring. Consequently, the elevator emergency stop will become heavier if it incorporates a coil-shaped elastic member. Further, the rope supporting the cage to which the elastic member is attached must be thicker and proportionally heavier. More electric power will inevitably be consumed to operate the elevator if the emergency stop incorporated in the elevator has a coil-shaped elastic member.

The brake shoes provided in the elevator emergency stop according to the invention have a coefficient of friction with respect to the rail, which is so high that the shoes can stop the cage moving at 1250 m/min. Since the shoes have such a high coefficient of friction, the elastic member incorporated in the elevator emergency stop can be a small, light U-shaped leaf spring. Thus, the elastic member can be light, and the rope supporting the cage to which the elastic member is secured can be light. As a result, the elevator of the invention which incorporates the emergency stop can operate at a reduced consumption of electric power.

Figure 16:
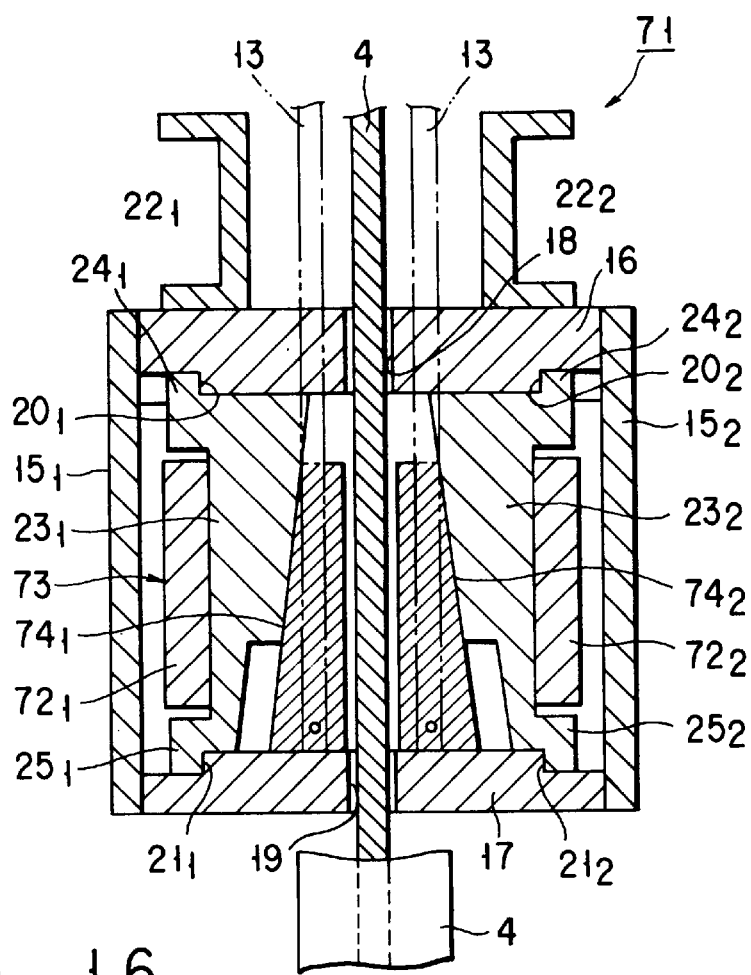
FIG. 16 is a cross-sectional view of yet another device for elevator emergency stop of the present invention.
Figure 17:
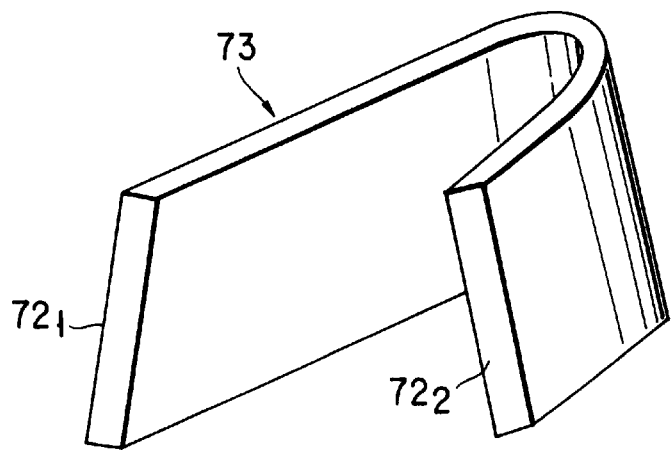
FIG. 17 is a slant view of an elastic member to be incorporated into the device for emergency stop of FIG. 16.

Referring now to FIGS. 16 and 17, still another device for emergency stop to be incorporated into an elevator of FIGS. 1 and 2 is explained in detail below. In the following description, the same elements as those mentioned in FIG. 3 are given the same symbols and the explanation for them is omitted.

The device for emergency stop 71 of FIG. 16 has, within a space defined by a pair of supporting plates $15_1$ and $15_2$ and by a pair of stopper plates 16 and 17, an elastic member 73 inserted in such a manner that the inner surface in the neighborhood of the ends $72_1$ and $72_2$ abuts against the outer lateral side of the guide members $23_1$ and $23_2$. As illustrated in FIG. 17, the elastic member 73 has a U-shaped top and ends $72_1$ and $72_2$ opening outwardly at the lower part so that the elastic force of the ends $72_1$ and $72_2$ for pressing the guide members $23_1$ and $23_2$ becomes larger as the upper portion of each of the guide members $23_1$ and $23_2$. A pair of brake shoes $74_1$ and $74_2$, face each other between the guide members $23_1$ and $23_2$ and the under part of the brake shoes $74_1$ and $74_2$ is superposed on the lower stopper plate 17. Each of the brake shoes $74_1$ and $74_2$ has a braking face extending in a vertical direction and a shape of a square trapezoidal pole.

Although the brake shoes $74_1$ and $74_2$ may take any construction where a material having a braking effect is placed on the braking face side, particularly preferred is the construction where the brake body has a braking piece described in (1-1) to (1-4) on the braking face side or the construction described in (2-1) to (2-4).

Referring now to FIGS. 16 and 17 and also to FIG. 18, the function of the device for emergency stop incorporated into an elevator of FIG. 1 and 2 is explained below.

As shown in FIG. 16, while the elevator is operated in a normal way, the opposed braking faces of a pair of brake shoes $74_1$ and $74_2$ are positioned holding a predetermined distance from the projection of the rail 4. Because of this positioning, the slowing down of the cage 2 by means of the device for elevator emergency stop is not effected.

Meanwhile, if the rope 3 of FIG. 1 is cut due to the trouble of the elevator, a so-called emergency state occurs where the cage 2, which will be elevated by the rope 3, will fall. As the cage 2 falls, the speed adjuster rope 6, which is linked to the cage 2 via the levers 9 and 10, also descends. If the speed adjuster 8 detects that the descending speed of the rope 6 exceeds a preset speed, the detecting signal is transmitted to the gripping member 14 to cause it to grip the speed adjuster rope 6. If the speed adjuster rope 6 is gripped in the above-described way, the first lever 9 and the second lever 10 each engaged with the engaging member 5, which is secured to a position midway within the length of the rope, pull the pulling wires 12 and 13.

Figure 18:
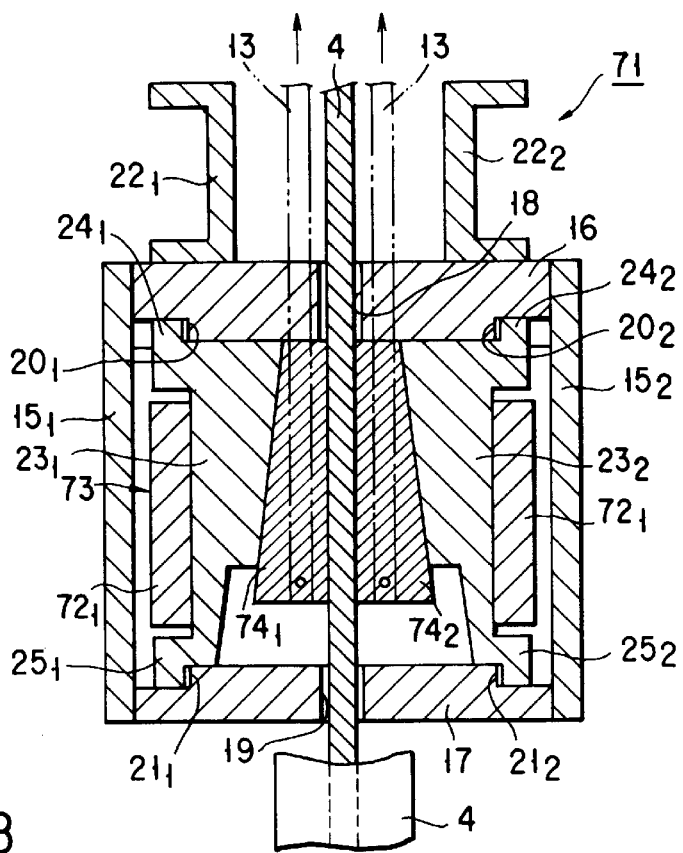
FIG. 18 is a cross-sectional view illustrating the state of emergency of yet another device for elevator emergency stop of the present invention.

If the pulling wires 12 and 13 are pulled, as shown in FIG. 18, a pair of the brake shoes $74_1$ and $74_2$ of a pair of devices for emergency stop 71 are pulled upward along the inclined surface of the guide members $23_1$ and $23_2$ resisting the elastic force that tends to bring the ends $72_1$ and $72_2$ closer to each other. As the brake shoes $74_1$ and $74_2$ are pulled upward, a force will be generated by which the braking faces pinch the projected portion of the rail 4 because the distance between the brake shoes $74_1$ and $74_2$ becomes so small that the opposed surfaces (braking faces) contact the projected portion of the rail 4 and the counteraction of the elastic member 73 adds to the pinching force. In this case, if the elastic force by the elastic member to the guide members $23_1$ and $23_2$ is uniform, the moment of force to be applied to the rail 4 for pulling up the brake shoes $74_1$ and $74_2$ may be localized to the lower part thereof. For this reason, the area, which actually contributes to the sliding on the rail, of the brake shoes $74_1$ and $74_2$ may decrease.

From the above-mentioned viewpoint, as illustrated in FIG. 17, the use of the elastic member 73, which has a U-shaped top and a lower part at the ends $72_1$ and $72_2$ opened outwardly so that the elastic force of the ends $72_1$ and $72_2$ for pressing the guide members $23_1$ and $23_2$ becomes larger as the upper portion of each of the guide members $23_1$ and $23_2$, makes it possible to provide a pressing force by the guide members $23_1$ and $23_2$ to the brake shoes $74_1$ and $74_2$ which are being pulled upward in such a manner that the pressing force becomes larger as the pressing point rises. Accordingly, the projected portion of the rail 4 can be pinched by the entire braking faces of the brake shoes $74_1$ and $74_2$ to generate a large frictional force between the brake shoes $74_1$ and $74_2$ and the projected portion of the rail 4 and thus the falling cage 2 can be slowed down and stopped.

The incorporation into a device for emergency stop 71 of the elastic member 73, which is constructed such that the elastic force of the ends $72_1$ and $72_2$ for pressing the guide members $23_1$ and $23_2$ becomes larger as the upper portion of each of the guide members $23_1$ and $23_2$, make it possible to enlarge the area between the brake shoes $74_1$ and $74_2$ and the projected portion of the rail 4. Therefore the frictional force between the brake shoes $74_1$ and $74_2$ and the projected portion of the rail 4 increases, or the elastic member 73 may be downsized if the same sliding property as hitherto is required.

Figure 19:
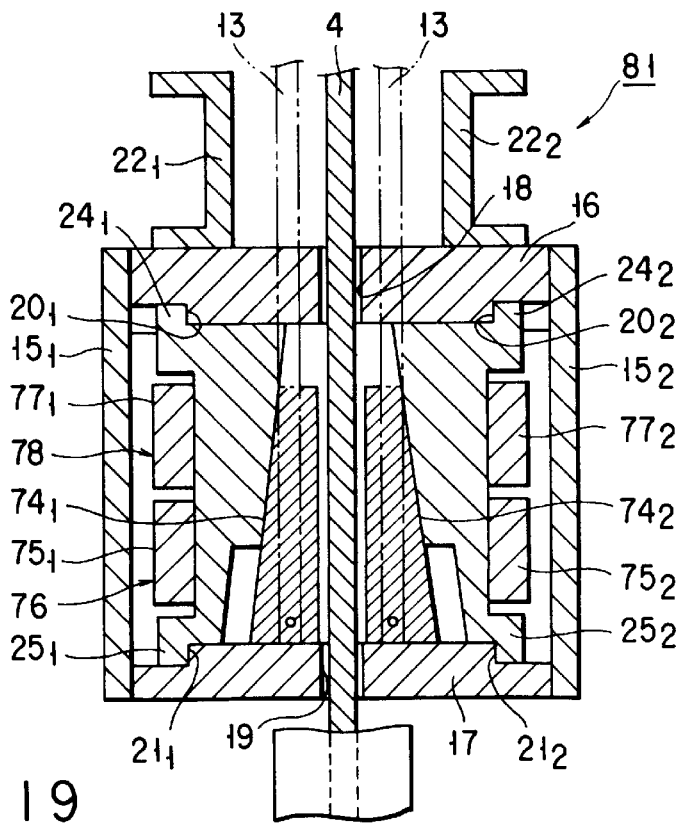
FIG. 19 is a cross-sectional view of yet another device for elevator emergency stop of the present invention.

The device for emergency stop prepared by the incorporation therein of an elastic member, which is constructed such that the pressing force becomes larger as the pressing point rises, is not limited to the construction illustrated in FIG. 16. And, the outside of guide member may be provided with a plurality of elastic members in such a manner that a larger elastic force is exerted as the pressing point rises. For example, as illustrated in FIG. 19, a device for emergency stop 81 may be prepared by inserting into a space defined by a pair of supporting plates $15_1$ and $15_2$ and by a pair of stopper plates 16 and 17, a first elastic member 76 having a U-shaped top and ends $75_1$ and $75_2$ capable of opening. The inner surface in the neighborhood of the ends $75_1$ and $75_2$ of the first elastic member 76 abuts against lower side of the outer lateral side of the guide members $23_1$ and $23_2$. A second elastic member 78 is inserted into the space in such a manner that the inner surface in the neighborhood of the ends $77_1$ and $77_2$ against the upper side of the outer lateral side of the guide members $23_1$ and $23_2$. The second elastic member 78 has a U-shaped top, ends $77_1$ and $77_2$ capable of opening and an elastic force greater than that of the first elastic member 76.

In the device for emergency stop 81 having such a construction, where a first elastic member 76 is positioned on the lower side of the outer lateral side of the guide members $23_1$ and $23_2$ and a second elastic member 78 which has an elastic force greater than that of the first elastic member 76 is positioned on the upper side of the surfaces of the guide members $23_1$ and $23_2$, if pressed by the elastic members 76 and 78, the guide members $23_1$ and $23_2$ can provide against the brake shoes $74_1$ and $74_2$ a pressing force which becomes larger as the pressing point rises when the brake shoes $74_1$ and $74_2$ are pulled upward. Therefore, as in the case of the device for emergency stop 71 of FIG. 16, it is possible to relax the moment of force to be applied to the rail 4 by the brake shoes $74_1$ and $74_2$ from concentration to the lower part thereof and it is possible to realize the state where the entire braking face of the brake shoes $74_1$ and $74_2$ is brought into a sliding contact with the rail 4 thereby enabling a larger frictional force to be exerted between the brake shoes $74_1$ and $74_2$ and the rail 4.

Preferred embodiments of the present invention are given below.

EXAMPLES 1–32 AND COMPARATIVE EXAMPLES 1–12

An inertial friction test was conducted by bringing a composite material for braking piece, which consisted of a ceramic base material and silicon carbide whisker (SiCw) and/or silicon carbide platelet (SiCpl) as indicated in Tables 1 and 2, into a sliding contact with a rail. In this case the sialon used as the ceramic base material was β-sialon of $Si_{6-Z}Al_ZN_{8-Z}$ (0<Z≦4.2) where z was 2, which was produced from a powder blend of $Si_3N4$, $Al_2O_3$ and AlN.

The inertial friction test was conducted in the following manner. Each material for braking pieces was formed into a pin-shaped test piece ($TP_1$), while SS400 as a material for rail was formed into a disk-shaped test piece ($TP_2$). The test was conducted in such a manner that the tip of the test piece $TP_1$ was pressed against the circular face of a rotating test piece $TP_2$ and the measurements of pressing force, frictional force and number of rotations were conducted until the rotation slowed down and stopped and the correlation between the frictional speed and the coefficient of friction was investigated. The testing condition was set up on the basis of a working condition of a device for emergency stop of elevator having a speed of 800 m/min and the load was chosen such that a facial pressure of 20 MPa was created. Values of coefficient of friction at a frictional speed of 750 m/min immediately after the start of sliding and the values of coefficient of friction midway at a frictional speed of 400 m/min are indicated in Tables 1 and 2. In Tables 1 and 2, $\mu750$ indicates values of coefficient of friction at a frictional speed of 750 m/min immediately after the start of sliding, while $\mu400$ indicates values of friction measured midway at a frictional speed of 400 m/min.

Figure 20:
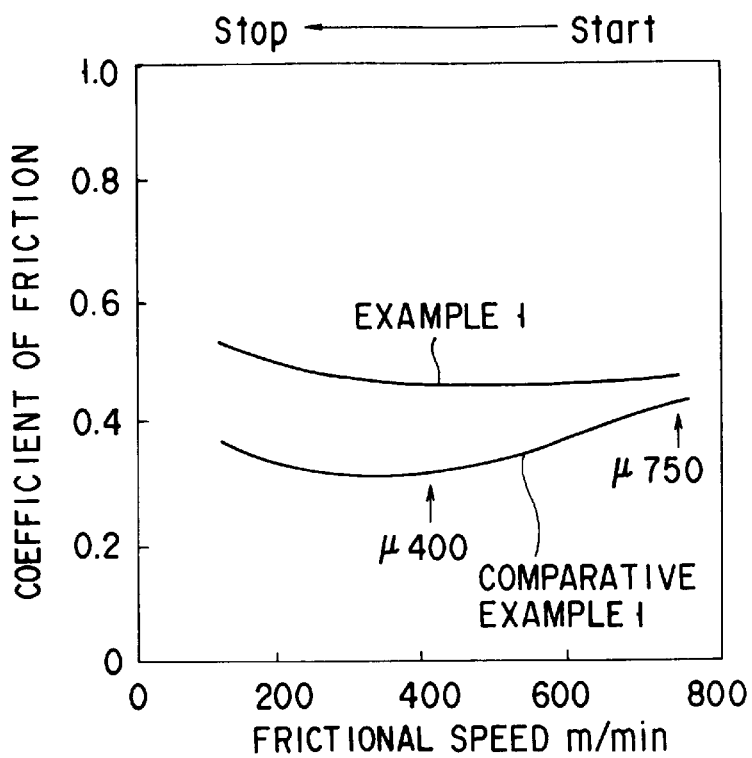
FIG. 20 gives characteristic curves showing the change in the coefficient of friction of composite materials for braking piece of Example 1 of the present invention and of Comparative Example 1, respectively, in the period from the start of friction to stop.

In addition, the change in the coefficient of friction in the period of from the start of friction to stop was examined for the composite material for braking piece of Example 1 indicated in Table 1 and for the composite material for braking piece of Comparative Example 1 indicated in Table 2. And, the results are shown in FIG. 20.

TABLE 1

| | Ceramic Base Material | SiCw (wt %) | SiCpl (wt %) | Coefficient of Friction | |
| --- | --- | --- | --- | --- | --- |
| | | | | $\mu750$ | $\mu400$ |
| Example 1 | $Si_3N_4$ | 10.00 | 5.00 | 0.48 | 0.47 |
| Example 2 | $Si_3N_4$ | 10.00 | 10.00 | 0.50 | 0.50 |
| Example 3 | $Si_3N_4$ | 15.00 | 10.00 | 0.51 | 0.50 |
| Example 4 | $Si_3N_4$ | 20.00 | 20.00 | 0.53 | 0.54 |
| Example 5 | $Si_3N_4$ | 15.00 | — | 0.45 | 0.44 |
| Example 6 | $Si_3N_4$ | — | 15.00 | 0.43 | 0.45 |
| Example 7 | $Si_3N_4$ | 5.00 | 10.00 | 0.48 | 0.49 |
| Example 8 | $Si_3N_4$ | 10.00 | 15.00 | 0.47 | 0.50 |
| Example 9 | $TiB_2$ | 10.00 | 5.00 | 0.51 | 0.50 |
| Example 10 | $TiB_2$ | 10.00 | 10.00 | 0.49 | 0.52 |
| Example 11 | $TiB_2$ | 15.00 | 10.00 | 0.52 | 0.52 |
| Example 12 | $TiB_2$ | 20.00 | 20.00 | 0.50 | 0.53 |
| Example 13 | $TiB_2$ | 15.00 | — | 0.51 | 0.52 |
| Example 14 | $TiB_2$ | — | 15.00 | 0.48 | 0.49 |
| Example 15 | $TiB_2$ | 5.00 | 10.00 | 0.50 | 0.52 |
| Example 16 | $TiB_2$ | 10.00 | 15.00 | 0.55 | 0.54 |
| Example 17 | SiC | 10.00 | 5.00 | 0.47 | 0.47 |
| Example 18 | SiC | 10.00 | 10.00 | 0.52 | 0.51 |
| Example 19 | SiC | 15.00 | 10.00 | 0.50 | 0.49 |
| Example 20 | SiC | 20.00 | 20.00 | 0.52 | 0.53 |
| Example 21 | SiC | 15.00 | — | 0.48 | 0.47 |
| Example 22 | SiC | — | 15.00 | 0.46 | 0.44 |
| Example 23 | SiC | 5.00 | 10.00 | 0.48 | 0.50 |
| Example 24 | SiC | 10.00 | 15.00 | 0.45 | 0.49 |

TABLE 2

| | Ceramic Base Material | SiCw (wt %) | SiCpl (wt %) | Coefficient of Friction $\mu$750 | $\mu$400 |
|---|---|---|---|---|---|
| Example 25 | Sialon | 10.00 | 5.00 | 0.52 | 0.53 |
| Example 26 | Sialon | 10.00 | 10.00 | 0.55 | 0.55 |
| Example 27 | Sialon | 15.00 | 10.00 | 0.54 | 0.54 |
| Example 28 | Sialon | 20.00 | 20.00 | 0.55 | 0.53 |
| Example 29 | Sialon | 15.00 | — | 0.53 | 0.51 |
| Example 30 | Sialon | — | 15.00 | 0.53 | 0.54 |
| Example 31 | Sialon | 5.00 | 10.00 | 0.55 | 0.55 |
| Example 32 | Sialon | 10.00 | 15.00 | 0.55 | 0.52 |
| Comparative Example 1 | $Si_3N_4$ | 5.00 | 5.00 | 0.43 | 0.31 |
| Comparative Example 2 | $Si_3N_4$ | — | 10.00 | 0.40 | 0.28 |
| Comparative Example 3 | $Si_3N_4$ | 5.00 | — | 0.41 | 0.30 |
| Comparative Example 4 | $TiB_2$ | 10.00 | 5.00 | 0.48 | 0.28 |
| Comparative Example 5 | $TiB_2$ | — | 10.00 | 0.45 | 0.30 |
| Comparative Example 6 | $TiB_2$ | 5.00 | — | 0.47 | 0.32 |
| Comparative Example 7 | SiC | 10.00 | 5.00 | 0.44 | 0.29 |
| Comparative Example 8 | SiC | — | 10.00 | 0.44 | 0.30 |
| Comparative Example 9 | SiC | 10.00 | — | 0.45 | 0.33 |
| Comparative Example 10 | Sialon | — | 5.00 | 0.50 | 0.37 |
| Comparative Example 11 | Sialon | — | 0.00 | 0.50 | 0.39 |
| Comparative Example 12 | Sialon | 5.00 | — | 0.48 | 0.38 |

From Tables 1 and 2 and FIG. 20, it can be seen that all of the composite materials for braking piece of Examples 1 to 32 have high coefficients of friction, which do not change, and therefore have excellent frictional properties. Particularly, sialon has a high coefficient of friction even if it is used alone.

Further, pairs of brake shoes were prepared by arranging braking pieces, which were each made of the composite materials for braking piece of Examples 1 to 32, on the braking face side of a brake body made of ductile cast iron. The brake shoes were incorporated into the device for elevator emergency stop shown in FIGS. 1 to 4. Then, the state of emergency stop was observed by dropping the cage at a speed of 800 m/min by cutting the rope. As a result, because of the friction between a pair of brake shoe and the rail, the cage slowed down and stopped within the fall of 30 m.

EXAMPLES 33–57 AND COMPARATIVE EXAMPLES 13–18

An inertial friction test was conducted by bringing a composite material for braking piece, which consisted of a ceramic base material and silicon carbide whisker (SiCw) and/or silicon carbide platelet (SiCpl), and fiber as indicated in Tables 3 and 4, into a sliding contact with a rail. Each material for braking pieces was formed into a pin-shaped test piece ($TP_1$), while SS400 as a material for rail was formed into a disk-shaped test piece ($TP_2$). The test was conducted in such a manner that the tip of the test piece $TP_1$ was pressed against the circular face of a rotating test piece $TP_2$ and the measurements of pressing force, frictional force and number of rotations were conducted until the rotation slowed down and stopped and the correlation between the frictional speed and the coefficient of friction was investigated. The testing condition was set up on the basis of a working condition of a device for emergency stop of elevator having a speed of 800 m/min and the load was chosen such that a facial pressure of 100 MPa, which was the double of that of Example 1, was created. Values of coefficient of friction at a frictional speed of 750 m/min immediately after the start of sliding and the values of coefficient of friction midway at a frictional speed of 400 m/min are indicated in Tables 3 and 4. In Tables 3 and 4, $\mu$750 indicates values of coefficient of friction at a frictional speed of 750 m/min immediately after the start of sliding, while $\mu$400 indicates values of friction measured midway at a frictional speed of 400 m/min.

TABLE 3

| | Ceramic Base Material | SiCw (wt %) | SiCpl (wt %) | Fiber; FIGS. written Brackets Indicate Incorporated Amounts (vol %) of Fibers | Coefficient of Friction $\mu$ 750 | $\mu$ 400 | Crack Development |
|---|---|---|---|---|---|---|---|
| Example 33 | $Si_3N_4$ | 15.00 | 10.00 | SiC(15) | 0.50 | 0.48 | None |
| Example 34 | $Si_3N_4$ | 15.00 | 10.00 | SiC(30) | 0.51 | 0.48 | None |
| Example 35 | $Si_3N_4$ | 15.00 | 10.00 | SiC(55) | 0.51 | 0.47 | None |
| Example 36 | $Si_3N_4$ | 15.00 | 10.00 | $Si_3N_4$(15) | 0.53 | 0.50 | None |
| Example 37 | $Si_3N_4$ | 15.00 | 10.00 | $Si_3N_4$(30) | 0.49 | 0.49 | None |
| Example 38 | $Si_3N_4$ | 15.00 | 10.00 | $Si_3N_4$(55) | 0.50 | 0.53 | None |
| Example 39 | $Si_3N_4$ | 15.00 | 10.00 | C(15) | 0.52 | 0.52 | None |
| Example 40 | $Si_3N_4$ | 15.00 | 10.00 | C(30) | 0.54 | 0.50 | None |
| Example 41 | $Si_3N_4$ | 15.00 | 10.00 | C(55) | 0.47 | 0.51 | None |
| Example 42 | $Si_3N_4$ | 15.00 | 10.00 | W(15) | 0.49 | 0.47 | None |
| Example 43 | $Si_3N_4$ | 15.00 | 10.00 | W(30) | 0.51 | 0.49 | None |
| Example 44 | $Si_3N_4$ | 15.00 | 10.00 | W(55) | 0.54 | 0.50 | None |
| Example 45 | $Si_3N_4$ | 15.00 | 10.00 | SiC(15) + $Si_3N_4$(15) | 0.51 | 0.50 | None |
| Example 46 | $Si_3N_4$ | 15.00 | 10.00 | SiC(15) + C(15) | 0.52 | 0.55 | None |
| Example 47 | $Si_3N_4$ | 15.00 | 10.00 | $Si_3N_4$(15) + W(15) | 0.53 | 0.54 | None |
| Example 48 | $Si_3N_4$ | 15.00 | 10.00 | SiC(10) + $Si_3N_4$(10) + C(10) | 0.55 | 0.57 | None |
| Example 49 | $Si_3N_4$ | 15.00 | 10.00 | SiC(10) + $Si_3N_4$(10) + C(10) + W(10) | 0.59 | 0.60 | None |

TABLE 4

| | Ceramic Base Material | SiCw (wt %) | SiCpl (wt %) | Fiber; FIGS. written Brackets Indicate Incorporated Amounts (vol %) of Fibers | Coefficient of Friction $\mu$ 750 | $\mu$ 400 | Crack Development |
|---|---|---|---|---|---|---|---|
| Example 50 | $TiB_2$ | 15.00 | 10.00 | SiC(30) | 0.51 | 0.54 | None |
| Example 51 | $TiB_2$ | 15.00 | 10.00 | $Si_3N_4$(30) | 0.52 | 0.51 | None |
| Example 52 | $TiB_2$ | 15.00 | 10.00 | C(30) | 0.52 | 0.49 | None |
| Example 53 | $TiB_2$ | 15.00 | 10.00 | W(30) | 0.47 | 0.50 | None |
| Example 54 | SiC | 15.00 | 10.00 | SiC(30) | 0.50 | 0.49 | None |
| Example 55 | SiC | 15.00 | 10.00 | $Si_3N_4$(30) | 0.53 | 0.48 | None |
| Example 56 | SiC | 15.00 | 10.00 | C(30) | 0.55 | 0.55 | None |
| Example 57 | SiC | 15.00 | 10.00 | W(30) | 0.51 | 0.50 | None |
| Comparative Example 13 | $Si_3N_4$ | 15.00 | 10.00 | SiC(60) | 0.50 | 0.31 | Presence |
| Comparative Example 14 | $Si_3N_4$ | 15.00 | 10.00 | $Si_3N_4$(60) | 0.51 | 0.22 | Presence |
| Comparative Example 15 | $Si_3N_4$ | 15.00 | 10.00 | C(60) | 0.51 | 0.18 | Presence |
| Comparative Example 16 | $Si_3N_4$ | 15.00 | 10.00 | W(60) | 0.51 | 0.35 | Presence |
| Comparative Example 17 | $TiB_2$ | 15.00 | 10.00 | SiC(60) | 0.54 | 0.33 | Presence |
| Comparative Example 18 | SiC | 15.00 | 10.00 | SiC(60) | 0.55 | 0.22 | Presence |

From Tables 3 and 4, it can be seen that all of the composite materials for braking piece of Examples 33 to 57 have high coefficients of friction, which do not change, and therefore have excellent frictional properties as well as good mechanical strength free of cracking.

Further, pairs of brake shoes were prepared by arranging braking pieces, which were each made of the composite materials for braking piece of Examples 33 to 57, on the braking face side of a brake body made of ductile cast iron. The brake shoes were incorporated into the device for elevator emergency stop shown in FIGS. 1 to 4. Then, the state of emergency stop was observed by dropping the cage at a speed of 800 m/min by cutting the rope. As a result, because of the friction between a pair of brake shoe and the rail, the cage slowed down and stopped within the fall of 30 m.

EXAMPLE 58

A braking piece having a construction illustrated in FIGS. 5A and 5B was prepared in the following way. A silicon nitride powder contained 5 wt % $Y_2O_3$ and 2 wt % $Al_2O_3$ as sintering aids, was admixed with 30 wt % of a silicon carbide long fibers (SCS-6 available from TEXTRON Co., Ltd.), in such a manner that the fibers oriented vertical to the surface of the plate-like final product. Each of the long fibers has heat resistance to a temperature exceeding 1700° C. and a high coefficient of friction. The resultant powder was hot-pressed for one hour in a nitrogen atmosphere under a condition of 1700° C. and 300 kg/cm² to manufacture a braking piece.

Figure 21:
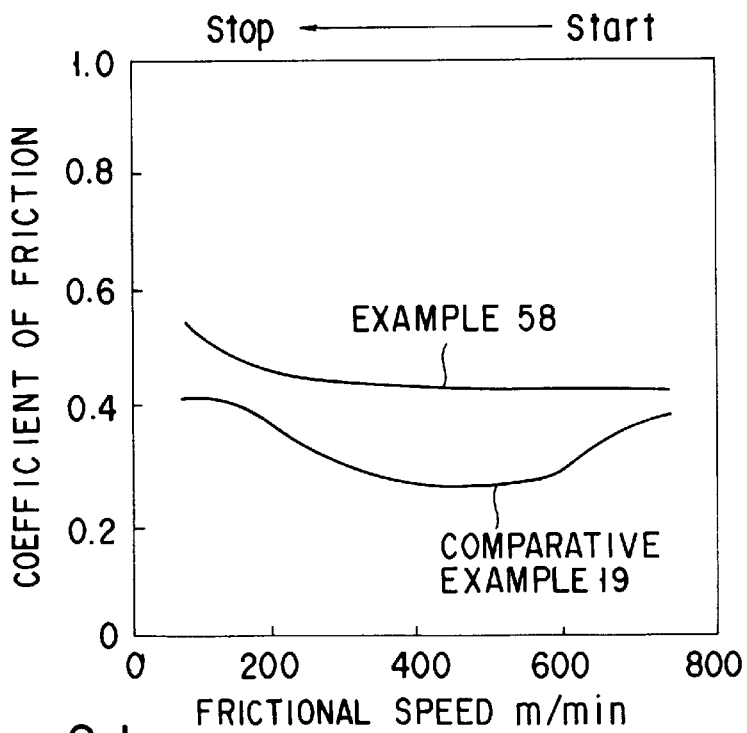
FIG. 21 gives characteristic curves showing the change in the coefficient of friction of composite materials for braking piece of Example 58 of the present invention and of Comparative Example 19, respectively, in the period from the start of friction to stop.

An inertial friction test was conducted by bringing the braking piece of Example 58 into a sliding contact with a rail. That is, a pin-shaped test piece ($TP_1$) for braking part was formed so that the silicon carbide long fibers are oriented vertical to the surface of the tip, while SS400 as a material for rail was formed into a disk-shaped test piece ($TP_2$). The test was conducted in such a manner that the tip of the test piece $TP_1$ was pressed against the circular face of a rotating test piece $TP_2$ and the measurements of pressing force, frictional force and number of rotations were conducted until the rotation slowed down and stopped and the relative wear amount after test of the pin-shaped test piece was investigated. The results are shown in FIGS. 21 and 22. The test conditions were set up based on the working conditions of a device for emergency stop of an elevator having a speed of 800 m/min. FIGS. 21 and 22 show the change in the coefficient of friction in the period of from start of friction to stop and the relative wear amounts after test of the pin-shaped test piece, respectively, obtained by conducting similar tests using a pin-shaped test piece $TP_1$ made of cast iron, FC250, as Comparative Example 19.

From FIG. 21, it can be seen that, comparing with the material for braking piece of Comparative Example 19, the braking piece of Example 58 exhibits a higher coefficient of friction from the point immediately after the start of friction and the coefficient becomes further stabilized in the period of from the start of the test to the stop. Also, based on FIG. 22, comparing with the material for braking piece of Comparative Example 19, the braking piece of Example 19 exhibits better property with respect to the relative wear amount.

Further, a pair of brake shoes were prepared by arranging braking pieces of Example 58 on the braking face side of a brake body made of ductile cast iron. The brake shoes were incorporated into the device for elevator emergency stop shown in FIGS. 1 to 4. Then, the state of emergency stop was observed by dropping the cage at a speed of 800 m/min by cutting the rope. As a result, because of the friction between a pair of brake shoe and the rail, the cage slowed down and stopped within the fall of 30 m.

EXAMPLE 59

A braking piece having a construction illustrated in FIGS. 6A and 6B was prepared in the following way. A silicon nitride powder contained 5 wt % $Y_2O_3$ and 5 wt % $MgAl_2O_4$ as sintering aids was admixed with 30 wt % of yarn made by bundling hundreds of Nicalon fibers (available from Nippon Carbon Co., Ltd.) each having a diameter of about 10 $\mu$m in such a manner that the yarn oriented vertical to the surface of the plate-like final product. The resultant powder was hot-pressed for one hour in a nitrogen atmosphere under a condition of 1600° C. and 300 kg/cm² to manufacture a braking piece.

An inertial friction test was conducted by bringing the braking piece of Example 59 into a sliding contact with a rail. That is, a pin-shaped test piece ($TP_1$) for braking part was formed so that the yarn oriented vertical to the surface of the tip, while SS400 as a material for rail was formed into a disk-shaped test piece ($TP_2$). The test was conducted in such a manner that the tip of the test piece $TP_1$ was pressed against the circular face of a rotating test piece $TP_2$ and the measurements of pressing force, frictional force and number of rotations were conducted until the rotation slowed down and stopped and the relative wear amount after test of the pin-shaped test piece was investigated. The results confirmed that a high coefficient of friction and a low level of wear amount were obtained as in the case of Example 58.

Further, a pair of brake shoes were prepared by arranging braking pieces of Example 59 on the braking face side of a brake body made of ductile cast iron. The brake shoes were incorporated into the device for elevator emergency stop shown in FIGS. 1 to 4. Then, the state of emergency stop was observed by dropping the cage at a speed of 800 m/min by cutting the rope. As a result, because of the friction between a pair of brake shoe and the rail, the cage slowed down and stopped within the fall of 30 m.

EXAMPLES 60–74

Figure 24A:
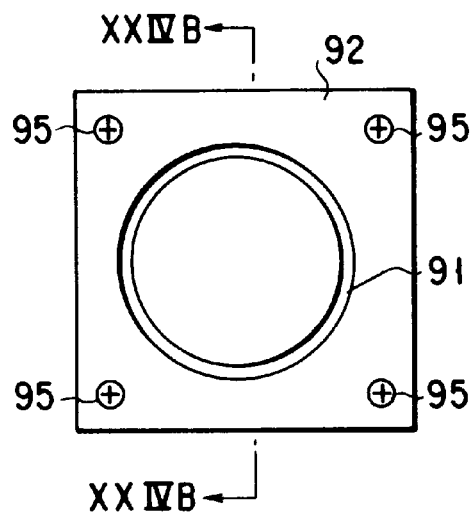
FIG. 24A is a front view of another test member employed in Examples 60 to 94.
Figure 24B:
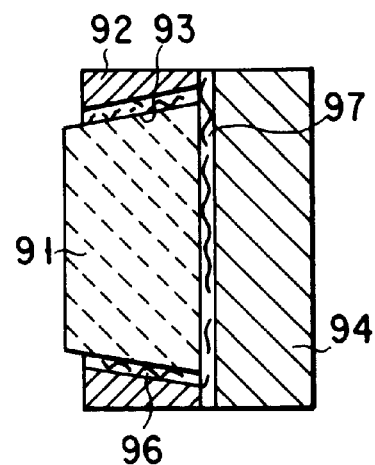
FIG. 24B is a cross-sectional view taken through reference line XXIVB—XXIVB of FIG. 24A.
Figure 25A:
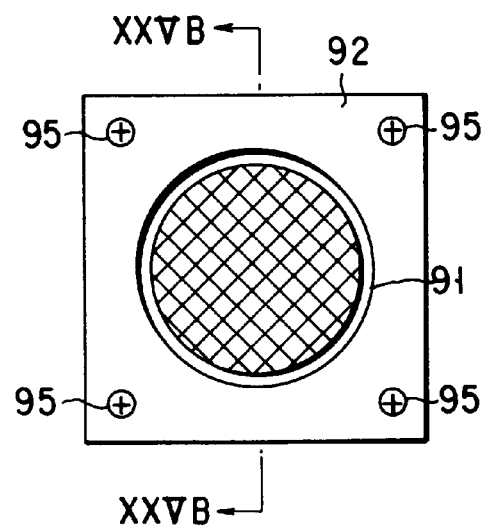
FIG. 25A is a front view of yet another test piece of members employed in Examples 60 to 94.
Figure 25B:
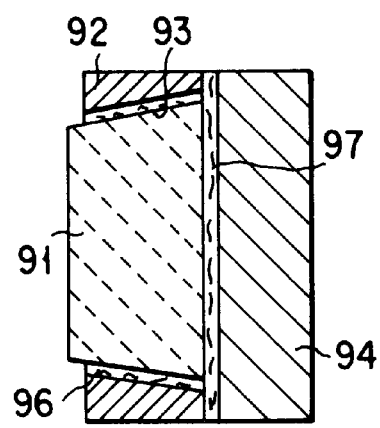
FIG. 25B is a cross-sectional view taken through reference line XXVB—XXVB of FIG. 25A.

FIG. 23A is a front view of a test member employed in the following Examples 60 to 94. FIG. 23B is a cross-sectional view taken through reference line XXIIIB—XXIIIB of FIG. 23A. FIG. 24A is a front view of another test member employed in the following Examples 60 to 94. FIG. 24B is a cross-sectional view taken through reference line XXIVB—XXIVB of FIG. 24A. FIG. 25A is a front view of yet another test member employed in Examples 60 to 94. And, FIG. 25B is a cross-sectional view taken through reference line XXVB—XXVB of FIG. 25A.

First, five kinds of sintered bodies were prepared in the following way. A powder consisting of 90 parts by weight of a silicon nitride powder ($Si_3N_4$), 5 parts by weight of $Y_2O_3$ and 5 parts by weight of $MgAl_2O_4$, each as a sintering aid, was admixed with 15 wt % of TiC particles, 10 wt % of TiN particles, 10 wt % of WC particles, 10 wt % of $B_4C$ particles, and 15 wt % of $TiB_2$ particles respectively. Each blend was hot-pressed in a nitrogen atmosphere under a pressure of 30 MPa. Then, braking pieces, each in the form of a conical trapezoid having a diameter of 15 mm for sliding face, a diameter of 17 mm for bottom and a thickness of 4.5 mm, were prepared by machining the sintered body. As illustrated in FIGS. 23A and 23B, a braking piece 91 was inserted into a through hole 93 in the form of a conical trapezoid of a stainless steel supporting block 92 in the form of a square pole. This structure was combined with a stainless steel supporting body 94 in the form of a square pole in such a manner that the bottom surface of the braking piece 91 abuts against the supporting body 94. Thereafter, the braking piece 91 was threadably attached to the supporting body 94 using screws 95 at four corners of the supporting block 92 in such a manner that the sliding face (braking face) projects from the surface of the supporting block 92 by a height of 500 μm. The test member was subjected to an inertial friction test according to the following procedure.

Two test members each having braking piece arrange each other a disk-like member of SS400, served as a rail material in such a manner that the braking pieces of the test members faces with the both circular face of the disk like member, respectively. The two test members were caused to pinch the rotating disk, and the measurements of pressing force, frictional force and number of rotations were conducted until the rotation slowed down and stopped. The testing condition was set up on the basis of a working condition of a device for emergency stop of elevator having a speed of 1250 m/min. The operation was repeated three times, and the state of the test members (braking pieces in particular) was observed at the first operation and at the third operation. The results are indicated in Table 5.

Test members of another construction were prepared in the following way. As illustrated in FIGS. 24A and 24B, a braking piece 91 was inserted into a through hole 93 in the form of a conical trapezoid of a stainless steel supporting block 92 in the form of a square pole via a conical cylinder body (buffering material) 96 made of a heat resistant silicon carbide long fiber cloth. This structure was combined with a stainless steel supporting body 94 in the form of a square pole in such a manner that the bottom surface of the braking piece 91 abuts against the supporting body 94 via a sheet (buffering material) 97 made of a heat resistant silicon carbide long fiber cloth. Thereafter, the braking piece 91 was threadably attached to the supporting body 94 using screws 95 driven through the sheet 97 at four corners of the supporting block 92 in such a manner that the sliding face (braking face) projects from the surface of the supporting block 92 by a height of 500 μm. The test member was subjected to the same inertial friction test as described in the above. The coefficient of friction of the sliding face as well as the state of the test members (braking pieces in particular) were observed at the first operation and at the third operation. The results are also indicated in Table 5.

Further, test members comprising the same sintered body and having the same construction as in FIGS. 24A and 24B were prepared, except that the prepared test members had a braking piece 91 having grid-like grooves with a depth of 0.2 mm and a pitch of 1.0 mm on the sliding face as shown in FIGS. 25A and 25B. The test member was subjected to the same inertial friction test as described in the above. The coefficient of friction of the sliding face as well as the state of the test members (braking pieces in particular) were observed at the first operation and at the third operation. The results are also indicated in Table 5.

COMPARATIVE EXAMPLE 20

A sintered body was prepared by hot-pressing a powder blend consisting of 90 parts by weight of a silicon nitride powder ($Si_3N_4$), 5 parts by weight of $Y_2O_3$ and 5 parts by weight of $MgAl_2O_4$, each as a sintering aid, in a nitrogen atmosphere under a pressure of 30 MPa. Thereafter, a braking pieces having a form of a conical trapezoid and the same size as that of Example 60 was prepared by machining the sintered body. A test member having the same construction as in FIGS. 24A and 24B was prepared by using of the braking piece. The test member was subjected to the same inertial friction test as described in the above. The coefficient of friction of the sliding face as well as the state of the test members (braking pieces in particular) were observed at the first operation and at the third operation. The results are also indicated in Table 5. In Table 5, slight cracks means that cracks occur only on the surface of the braking piece, while significant cracks means that cracks occur from the surface in the direction of depth.

TABLE 5

| | Construction of Test Members | | | | | | |
|---|---|---|---|---|---|---|---|
| | Construction of Braking Piece | | Presence or Absence of Bufferings Material | Presence or Absence of Grid-like Grooves | Coefficient of Friction ($\mu$) | State of Braking Piece | |
| | Composite Particles | Amount of Composite Particles | | | | 1st | 3rd |
| Comparative Example 20 | — | — | Absent | Absent | 0.28 | No Crack | Slight Cracks |
| Example 60 | TiC | 15 wt % | Absent | Absent | 0.33 | No Crack | Significant Cracks |
| Example 61 | | | Present | Absent | 0.33 | No Crack | No Crack |
| Example 62 | | | Present | Present | 0.42 | No Crack | No Crack |
| Example 63 | TiN | 10 wt % | Absent | Absent | 0.32 | No Crack | Significant Cracks |
| Example 64 | | | Present | Absent | 0.32 | No Crack | No Crack |
| Example 65 | | | Present | Present | 0.41 | No Crack | No Crack |
| Example 66 | WC | 10 wt % | Absent | Absent | 0.32 | No Crack | Significant Cracks |
| Example 67 | | | Present | Absent | 0.33 | No Crack | No Crack |
| Example 68 | | | Present | Present | 0.41 | No Crack | No Crack |
| Example 69 | $B_4C$ | 10 wt % | Absent | Absent | 0.34 | No Crack | Significant Cracks |
| Example 70 | | | Present | Absent | 0.34 | No Crack | No Crack |
| Example 71 | | | Present | Present | 0.45 | No Crack | No Crack |
| Example 72 | $TiB_2$ | 15 wt % | Absent | Absent | 0.39 | No Crack | Significant Cracks |
| Example 73 | | | Present | Absent | 0.39 | No Crack | No Crack |
| Example 74 | | | Present | Present | 0.49 | No Crack | No Crack |

As seen from Table 5, the braking parts of Examples 60 to 74 exhibit higher coefficients of friction that the braking part of Comparative Example 20. Their coefficients of friction are, however, lower than the coefficients of friction of the braking parts of Examples shown in Tables 1 to 4. This is because the experiments were conducted on the braking parts of Examples 60 to 74 on the assumption that the cage was falling at 1250 m/min, which is a very high speed.

Also, it can be seen that none of the braking pieces of test members of Examples 60 to 74 and of the braking piece of the test member of Comparative Example 20 cracks at the first operation of the inertial friction test.

Particularly, the braking pieces of test members, which utilize the buffering material, of Examples 61, 62, 64, 65, 67, 68, 70, 71, 73 and 74 are entirely free of cracks, thereby indicating a high level of braking action. Also, it can be seen that the braking pieces of test members, which have grid-like grooves on the sliding face, of Examples 62, 65, 68, 71 and 74 have a higher coefficient of friction.

Further, brake shoes each having braking piece as shown in FIGS. 9A and 9B through FIGS. 12A and 12B were prepared. The braking piece of each of the brake shoes was prepared from sintered bodies containing, respectively, 15 wt % of TiC particles, 10 wt % of TiN particles, 10 wt % of WC particles, 10 wt % of $B_4C$ particles, and 15 wt % of $TiB_2$ particles. The brake shoes were incorporated into the devices for elevator emergency stop shown in FIGS. 1, 2 and 8. Then, the state of emergency stop was observed by dropping the cage at a speed of 1250 m/min by cutting the rope. As a result, because of the friction between a pair of brake shoe and the rail, the cage slowed down and stopped within the fall of 30 m in the case of any one of the devices for elevator emergency stop.

EXAMPLES 75–84

First, powder was prepared which consisted of 90 parts by weight of silicon nitride ($Si_3N_4$) powder, 5 parts by weight of $Y_2O_3$ and 5 parts by weight of $MgAl_2O_4$. Five portions were made of the powder thus prepared. TiC particles, TiN particles, WC particles, $B_4C$ particles and $TiB_2$ particles all having an average diameter of 50 $\mu$m, were mixed with the five portions of the power, in prescribed amounts. As a result, five mixing powders were obtained. Each mixing powder was hot-pressed in a nitrogen atmosphere under a pressure of 30 MPa. Then, five kinds of braking pieces, each in the form of a conical trapezoid having a diameter of 15 mm for sliding face, a diameter of 17 mm for bottom and a thickness of 4.5 mm, were prepared by machining the sintered body. In the braking pieces, TiC particles, TiN particles, WC particles, $B_4C$ particles and $TiB_2$ particles were dispersed in an amount of 10 to 15 wt % in the region ranging from the surface to a depth of 0.5 mm (about 11% of the total thickness), respectively. Thereafter, test members as illustrated in FIGS. 23A and 23B were prepared by using these braking pieces. The test members were subjected to the same inertial friction test as in the case of Example 60, and the coefficient of friction of the sliding face as well as the state of the test members (braking pieces in particular) were observed at the first operation and at the third operation. The results are indicated in Table 6.

Further, five kinds of braking pieces, each in the form of a conical trapezoid having a diameter of 15 mm for sliding face, a diameter of 17 mm for bottom and a thickness of 4.5 mm, were prepared by machining the sintered body. In these braking pieces TiC particles, TiN particles, WC particles, $B_4C$ particles, and $TiB_2$ particles were dispersed in an amount of 10 to 15 wt % in the region ranging from the surface to a depth of 0.5 mm (about 11% of the total thickness), respectively. In addition, each braking pieces had grid-like grooves with a depth of 0.2 mm and a pitch of 1.5 mm on the sliding face. Thereafter, by use of these braking pieces, test members as illustrated in FIGS. 25A and 25B were prepared. The test members were subjected to the same inertial friction test as described in the above, and the coefficient of friction of the sliding face as well as the state of the test members (braking pieces in particular) were observed at the first operation and at the third operation. The results are also indicated in Table 6.

In Table 6, slight cracks means that cracks occur only on the surface of the braking piece, while significant cracks means that cracks occur from the surface in the direction of depth.

TABLE 6

| | Construction of Test Members | | | | | | |
|---|---|---|---|---|---|---|---|
| | Construction of Braking Piece | | | | | | |
| | Composite Particles | Amount of Composite Particles or Layer Side | Presence or Absence of Bufferings Material | Presence or Absence of Grid-Like Grooves | Coefficient of Friction ($\mu$) | State of Braking Piece | |
| | | | | | | 1st | 3rd |
| Example 75 | TiC | 15 wt % | Absent | Absent | 0.34 | No Crack | Slight Cracks |
| Example 76 | | | Present | Present | 0.48 | No Crack | No Crack |
| Example 77 | TiN | 10 wt % | Absent | Absent | 0.32 | No Crack | Slight Cracks |
| Example 78 | | | Present | Present | 0.47 | No Crack | No Crack |
| Example 79 | WC | 10 wt % | Absent | Absent | 0.32 | No Crack | Slight Cracks |
| Example 80 | | | Present | Present | 0.45 | No Crack | No Crack |
| Example 81 | $B_4C$ | 10 wt % | Absent | Absent | 0.35 | No Crack | Slight Cracks |
| Example 82 | | | Present | Present | 0.54 | No Crack | No Crack |
| Example 83 | $TiB_2$ | 15 wt % | Absent | Absent | 0.40 | No Crack | Slight Cracks |
| Example 84 | | | Present | Present | 0.58 | No Crack | No Crack |

From Table 6, it can be seen that the braking pieces of the test members of Example 75, 77, 79, 81 and 83 exhibit a high coefficient of friction equivalent to that of the braking pieces of the test members of Example 60, 63, 66, 69 and 72 which use the same composite particles (ceramic particles), dispersed throughout the entire thickness, respectively. Besides, whereas the braking pieces of the test pieces of Example 60, 63, 66, 69 and 72 which develop cracks in the braking piece using no buffering material in the depth direction at the third operation of the inertial friction test, the braking pieces of the test pieces of Example 75, 77, 79, 81 and 83 exhibit cracks only on the surface at the third operation of the inertial friction test. This is, because composite particles such as TiC particles are dispersed only in the surface layer that needs to impart a high coefficient of friction in the braking pieces of the test members of Example 75, 77, 79, 81 and 83, while the region of the braking piece, which comprises $Si_3N_4$ and contains none of the dispersed composite particles, has the impact resistance enhanced.

Also, it can be seen from the Table 6 that none of the braking pieces of test members of Examples 76, 78, 80, 82 and 84 develops any crack even at the third operation of the inertial friction test and that the braking pieces themselves have a high coefficient of friction and have a high braking function.

Further, brake shoes as illustrated in FIGS. 9A and 9B through FIGS. 12A and 12B were prepared by using braking pieces. In the braking pieces, TiC particles, TiN particles, WC particles, $B_4C$ particles, and $TiB_2$ particles were dispersed in an amount of 10 to 15 wt % in the region ranging from the surface to a depth of 0.5 mm of the braking piece, respectively. In addition, the aforementioned grid-like grooves were formed on the sliding face of each of the braking pieces. The brake shoes were incorporated into the devices for elevator emergency stop shown in FIGS. 1, 2 and 8. Then, the state of emergency stop was observed by dropping the cage at a speed of 1250 m/min by cutting the rope. As a result, because of the friction between a pair of brake shoe and the rail, the cage slowed down and stopped within the fall of 30 m in the case of any one of the devices for elevator emergency stop.

EXAMPLES 85–94

First, powder was prepared which consisted of 90 parts by weight of silicon nitride ($Si_3N_4$) powder, 5 parts by weight of $Y_2O_3$ and 5 parts by weight of $MgAl_2O_4$. Five portions were made of the powder thus prepared. TiC particles, TiN particles, WC particles, $B_4C$ particles and $TiB_2$ particles, all having an average diameter of 50 $\mu$m, were mixed with the five portions of the powder, in prescribed amounts. As a result, five mixing powders were obtained. Each mixing powder was hot-pressed in a nitrogen atmosphere under a pressure of 30 MPa. Then, ten kinds of braking pieces, each in the form of a conical trapezoid having a diameter of 15 mm for sliding face, a diameter of 17 mm for bottom and a thickness of 4.5 mm, were prepared by machining the sintered body. In the braking pieces, wherein TiC particles, TiN particles, WC particles, $B_4C$ particles, and $TiB_2$ particles, were dispersed in an amount of 10 to 15 wt % in the region ranging from the surface to a depth of 0.225 mm (5% of the total thickness) and to a depth of 1.26 mm (28% of the total thickness), respectively. In addition grid-like grooves with a depth of 0.2 mm and a pitch of 1.5 mm were formed on the sliding face of each of the braking pieces. Thereafter, by use of these braking pieces, test members as illustrated in FIGS. 25A and 25B were prepared. The test members were subjected to the same inertial friction test as described in the above, and the coefficient of friction of the sliding face as well as the state of the test members (braking pieces in particular) were observed at the first operation and at the third operation. The results are also indicated in Table 7. Table 7 includes the results of Examples 76, 78, 80, 82 and 84, too.

In Table 7, slight cracks means that cracks occur only on the surface of the braking piece.

TABLE 7

Construction of Test Members

| | Construction of Braking Piece | | | | | State of Braking Piece | |
|---|---|---|---|---|---|---|---|
| | Composite Particles | Thickness of Surface Layer* | Presence or Absence of Bufferings Material | Presence or Absence of Grid-like Grooves | Coefficient of Friction ($\mu$) | 1st | 3rd |
| Example 85 | TiC | 5% | Present | Present | 0.48 | No Crack | No Crack |
| Example 76 | | about 11% | Present | Present | 0.48 | No Crack | No Crack |
| Example 86 | | 28% | Present | Present | 0.45 | No Crack | Slight Cracks |
| Example 87 | TiN | 5% | Present | Present | 0.47 | No Crack | No Crack |
| Example 78 | | about 11% | Present | Present | 0.47 | No Crack | No Crack |
| Example 88 | | 28% | Present | Present | 0.43 | No Crack | Slight Cracks |
| Example 89 | WC | 5% | Present | Present | 0.47 | No Crack | No Crack |
| Example 80 | | about 11% | Present | Present | 0.45 | No Crack | No Crack |
| Example 90 | | 28% | Present | Present | 0.42 | No Crack | Slight Cracks |
| Example 91 | $B_4C$ | 5% | Present | Present | 0.54 | No Crack | No Crack |
| Example 82 | | about 11% | Present | Present | 0.54 | No Crack | No Crack |
| Example 92 | | 28% | Present | Present | 0.53 | No Crack | No Crack |
| Example 93 | $TiB_4$ | 5% | Present | Present | 0.59 | No Crack | No Crack |
| Example 84 | | about 11% | Present | Present | 0.58 | No Crack | No Crack |
| Example 94 | | 28% | Present | Present | 0.57 | No Crack | No Crack |

*; The thickness (%) of Surface Layer Indicates a Proportion of the Thickness

From Table 7, it can be seen that the crack formation is limited to the surface at the third operation of the inertial friction test for the test members of Examples 86, 88, 90, 92 and 94 where use is made of a buffering material and of a braking piece in which composite particles such as TiC particles, were dispersed only in the surface layer having a thickness of 28% of the total thickness.

Also, in the case of the test members of Examples 76, 85, 78, 87, 80, 89, 82, 91, 84 and 93 used a buffering material and braking piece which has grid-like grooves in the sliding face and in which composite particles such as TiC particles, TiN particles, WC particles, $B_4C$ particles and $TiB_2$ particles were dispersed only in the surface layer having a thickness of about 11% or 5% of the total thickness, each the braking piece is entirely free of cracks even after the third operation of the inertial friction test. In addition each the braking piece itself has a high coefficient of friction and a high braking function.

Further, brake shoes as illustrated in FIGS. 9A and 9B through FIGS. 12A and 12B were prepared by use of braking pieces. In the braking pieces, TiC particles, TiN particles, WC particles, $B_4C$ particles, and $TiB_2$ particles were dispersed in an amount of 10 to 15 wt % in the region ranging from the surface to a depth of 0.225 mm (about 5% of the total thickness) of the braking pieces, respectively. In addition, each braking pieces had grid-like grooves on the sliding face. The brake shoes were incorporated into the devices for elevator emergency stop shown in FIGS. 1, 2 and 8. Then, the state of emergency stop was observed by dropping the cage at a speed of 1250 m/min by cutting the rope. As a result, because of the friction between a pair of brake shoe and the rail, the cage slowed down and stopped within the fall of 30 m in the case of any one of the devices for elevator emergency stop.

EXAMPLE 95

A silicon nitride powder contained 5 wt % of $Y_2O_3$ and 5 wt % of $MgAl_2O_4$, each as a sintering aid, was hot-pressed for one hour in a nitrogen atmosphere under a condition of 1700° C. and 300 kg/cm² to produce a plate-like sintered body. Subsequently, the sintered body was NC machined into braking pieces of the constructions as illustrated in FIG. 13A and 13B having pyramid-shaped projections regularly arranged.

EXAMPLE 96

A silicon nitride powder, contained 5 wt % of $Y_2O_3$ and 5 wt % of $MgAl_2O_4$, each as a sintering aid, was hot-pressed for one hour in a nitrogen atmosphere under a condition of 1700° C. and 300 kg/cm² to produce a plate-like sintered body. Subsequently, the sintered body was NC machined into braking pieces of the constructions as illustrated in FIGS. 14A and 14B having parallel semi-cylindrical projections regularly arranged.

An inertial friction test was conducted by bringing braking pieces of Examples 95 and 96 into a sliding contact with a rail. That is, a pin-shaped test piece ($TP_1$) for braking piece was formed so that the projections were present at the tip face, while SS400 as a material for rail was formed into a disk-shaped test piece ($TP_2$). The test was conducted in such a manner that the tip of the test piece $TP_1$ was pressed against the circular face of a rotating test piece $TP_2$ and the measurements of pressing force, frictional force and number of rotations were conducted until the rotation slowed down and stopped and the relative wear amount after test of the pin-shaped test piece was investigated. The results are shown in FIGS. 26 and 27. The FIGS. 26 and 27 show the results of Comparative Example 19, too.

From FIG. 26, it can be seen that, relative to the material for brake of Comparative Example 19, the braking pieces of Example 95 and 96 exhibit a higher coefficient of friction from the point immediately after the start of friction and the coefficient becomes further stabilized in the period of from the start of the test to the stop. Also, from FIG. 27, it can be seen that, relative to the material for brake of Comparative Example 19, the braking pieces of Examples 95 and 96 exhibit better property with respect to the relative wear amount.

Further, brake shoes, as illustrated in FIGS. 9A and 9B through FIGS. 12A and 12B, were prepared by use of braking pieces of Examples 95 and 96. The brake shoes were incorporated into the devices for elevator emergency stop shown in FIGS. 1, 2 and 8. Then, the state of emergency stop was observed by dropping the cage at a speed of 1250 m/min by cutting the rope. As a result, because of the friction between a pair of brake shoe and the rail, the cage slowed down and stopped within the fall of 30 m in the case of any one of the devices for elevator emergency stop.

EXAMPLES 97–100

Pairs of brake shoes were prepared by arranging braking pieces made of composite materials of Examples 3, 11, 19 and 27 on the braking face side of a brake body made of ductile cast iron. The pairs of brake shoes were incorporated into the devices for elevator emergency stop 71 shown in FIG. 16. Then, the state of emergency stop was observed by dropping the cage at a speed of 1250 m/min by cutting the rope. As a result, because of the friction between a pair of brake shoes and the rail, the cage slowed down and stopped within the fall of 30 m in the case of any one of the devices for elevator emergency stop. After the emergency stop, the brake shoes were taken out of the device for emergency stop, and the braking pieces were observed. According to the result of the observation, each of the braking pieces had a trace indicating that entire surface of the braking piece including upper portion and lower portion contacted the projected portion of the rail.

EXAMPLES 101–105

Pairs of brake shoes as illustrated in FIGS. 9A and 9B, were prepared by use of braking pieces of Examples 62, 65, 68, 71 and 74. The pairs of brake shoes were incorporated into the devices for elevator emergency stop 81 as shown in FIG. 19. Then, the state of emergency stop was examined by dropping the cage at a speed of 1250 m/min by cutting the rope. As a result, because of the friction between a pair of brake shoes and the rail, the cage slowed down and stopped within the fall of 30 m in the case of any one of the devices for elevator emergency stop. After the emergency stop, the brake shoes were taken out of the device for emergency stop, and the braking pieces were observed. According to the result of the observation, each of the braking pieces had a trace indicating that all of the plural projections of braking pieces contacted the projected portion of the rail.

As explained in the above, according to the present invention there is provided a brake shoe for elevator emergency stop which has a heat resistance to a temperature that exceeds 1000° C. as well as a stabilized high coefficient of friction and an excellent seizure-resistance to rails even under the condition of high speed and high stress.

Further, according to the present invention there is provided a brake shoe for elevator emergency stop which has a heat resistance to a temperature that exceeds 1000° C. as well as a stabilized high coefficient of friction, an excellent impact resistance and a stabilized braking property even under the condition of high speed and high stress.

Further, according to the present invention there is provided a device for elevator emergency stop where the cage can be securely slowed down and stopped without causing seizure on the rail, at the time when the cage of the elevator is caused to fall due to the breakdown of the elevating means of the elevator.

Further, according to the present invention there is provided a device for elevator emergency stop where a stabilized braking property can be exhibited without causing seizure on the rail and the cage can be securely slowed down and stopped at the time when the cage of the elevator is caused to fall due to the breakdown of the elevating means of the elevator.

Still further, according to the present invention there is provided an elevator with an emergency stop function where the cage can be securely slowed down and stopped without causing seizure on the rail at the time when the cage of the elevator is caused to fall due to the breakdown of the elevating means of the elevator.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A brake shoe for elevator emergency stop, comprising:
   a brake body having a braking face and a braking piece embedded in a braking face side of said brake body,
   wherein said braking piece is made of a composite material containing a ceramic base material selected from the group consisting of silicon nitride or titanium boride, sialon and silicon carbide, and no less than 10 wt % of at least one ceramic material selected from the group consisting of a silicon carbide whisker and a silicon carbide platelet.

2. The brake shoe according to claim 1, wherein said braking piece further contains 10 to 55 volume percent of at least one long fiber selected from the group consisting of silicon carbide, silicon nitride, carbon and tungsten.

3. A device for elevator emergency stop comprising:
   an elastic member having a U shape opening and closing in a horizontal direction;
   a pair of guide members opposing each other and having outer surfaces contacting the ends of said elastic member, respectively, and inner surfaces inclining such that a gap between said guide members gradually decreases toward the upper ends of said guide members;
   a rail having a T-shaped cross section, positioned between said guide members and extending in a vertical direction;
   a pair of brake shoes provided in the gap between said guide members, arranged symmetrically with respect to said rail so as to move vertically along the inner surfaces of the guide members, and having braking faces opposing each other; and
   a pair of pulling means attached to said brake shoes, respectively, for pulling upward said brake shoes along said guide members, in the case of emergency, to cause said elastic members to press said guide members so that said brake shoes pinch said rail,
   wherein said brake shoe comprises (a) a brake body having a braking face and (b) a braking piece embedded in a braking face side of said brake body,
   said braking piece is made of a composite material containing a ceramic base material selected from the group consisting of silicon nitride, titanium boride, sialon and silicon carbide, and no less than 10 wt % of at least one ceramic material selected from the group consisting of a silicon carbide whisker and a silicon carbide platelet.

4. An elevator with an emergency stop function comprising:

an elevating cage;

an elastic member having a U shape, opening and closing in a horizontal direction and attached to the bottom part of said cage by a supporting means;

a pair of guide members opposing each other and having outer surfaces contacting the ends of said elastic member, respectively, and inner surfaces inclining such that a gap between said guide members gradually decreases toward the upper ends of said guide members;

a rail having a T-shaped cross section, positioned between said guide members and extending in a vertical direction;

a pair of brake shoes provided in the gap between said guide members, arranged symmetrically with respect to said rail so as to move vertically along the inner surfaces of the guide members, and having braking faces opposing each other; and a pair of pulling means attached to said brake shoes, respectively, for pulling upward said brake shoes along said guide members, at the time when said cage falls due to the breakdown of said elevator, to cause said elastic member to press said guide members so that said brake shoes pinch said rail;

wherein said brake shoe comprises (a) a brake body having a braking face and (b) a braking piece embedded in a braking face side of said brake body, and said braking piece is made of a composite material containing a ceramic base material selected from the group consisting of silicon nitride, titanium boride, sialon and silicon carbide, and no less than 10 wt % of at least one ceramic material selected from the group consisting of a silicon carbide whisker and a silicon carbide platelet.

5. A brake shoe for elevator emergency stop comprising a brake body having a braking face and a braking piece embedded in a braking face side of said brake body, wherein said braking piece is made of a composite material containing a ceramic base material selected from the group consisting of silicon nitride, titanium boride, sialon and silicon carbide, and a plurality of ceramic fibers dispersed and embedded in the base material to be present in a vertical state at the braking face.

6. The brake shoe according to claim 5, wherein the ceramic fibers comprise a plurality of bundled fibers.

7. A device for elevator emergency stop comprising:

an elastic member having a U shape, opening and closing in a horizontal direction;

a pair of guide members opposing each other and having outer surfaces contacting the ends of said elastic member, respectively, and inner surfaces inclining such that a gap between said guide members gradually decreases toward the upper ends of said guide members;

a rail having a T-shaped gross section, positioned between said guide members and extending in a vertical direction;

a pair of brake shoes provided in the gap between said guide members, arranged symmetrically with respect to said rail so as to move vertically along the inner surfaces of the guide members, and having braking faces opposing each other; and a pair of pulling means attached to said brake shoes, respectively, for pulling upward said brake shoes along said guide members, in the case of emergency, to cause said elastic members to press said guide members so that said brake shoes pinch said rail;

wherein said brake shoe comprises (a) a braking face and (b) a braking piece embedded in a braking face side of said brake body, said braking piece is made of a composite material containing a ceramic base material selected from the group consisting of silicon nitride, titanium boride, sialon and silicon carbide, and a plurality of ceramic fibers dispersed and embedded in the base material to be present in a vertical state at the braking face.

8. An elevator with an emergency stop function comprising:

an elevating cage;

an elastic member having a V shape, opening and closing in a horizontal direction and attached to the bottom part of said cage by a supporting means;

a pair of guide members opposing each other and having outer surfaces contacting the ends of said elastic member, respectively, and inner surfaces inclining such that a gap between said guide members gradually decreases toward the upper ends of said guide members;

a rail having a T-shaped cross section, positioned between said guide members and extending in a vertical direction;

a pair of brake shoes provided in the gap between said guide members, arranged symmetrically with respect to said rail so as to move vertically along the inner surfaces of the guide members, and having braking faces opposing each other; and a pair of pulling means attached to said brake shoes, respectively, for pulling upward said brake shoes along said guide members, at the time when said cage falls due to the breakdown of said elevator, to cause said elastic member to press said guide members so that said brake shoes pinch said rail;

wherein said brake shoe comprises (a) a brake body having a braking face and (b) a braking piece embedded in a braking face side of said brake body, said braking piece is made of a composite material containing a ceramic base material selected from the group consisting of silicon nitride, titanium boride, sialon and silicon carbide, and a plurality of ceramic fibers dispersed and embedded in the base material to be present in a vertical state at the braking face.

9. A brake shoe for elevator emergency stop comprising (a) a brake body having a braking face; and (b) a plurality of braking pieces embedded in a braking face side of the brake body to be projected from the braking face to form projections of a column or a multi-cornered pole having rounded corners, and made of a composite material containing a ceramic base material selected from the group consisting of silicon nitride, silicon carbide and sialon, and particles of at least one ceramic material selected from the group consisting of a carbide, a nitride and a boride, having diameters in the range of 10 to 150 $\mu$m and dispersed into the ceramic base material.

10. The brake shoe according to claim 9, wherein said ceramic particles are dispersed in a surface layer of said braking piece, which has a depth of 30% or less of the total thickness from the surface.

11. The brake shoe according to claim 9, wherein the surface of said projections has a grid-shaped grooves having a depth of 0.1 to 0.5 mm and having a pitch of 0.5 to 5 mm.

12. The brake shoe according to claim 9, wherein the surface of said projections has a plurality of projections.

13. The brake shoe according to claim 9, wherein a sheet-shaped cushioning material is further positioned at least between said brake body and a plurality of said braking pieces.

14. The brake shoe according to claim 9, wherein the space between said brake body and a plurality of said braking pieces is further filled with a liquid.

15. The brake shoe according to claim 9, wherein a metal supporting member is further embedded in the braking face side of said brake body in order to support a plurality of the braking pieces.

16. The brake shoe according to claim 15, wherein said metal supporting member has a plurality of through holes each in the form of a conical trapezoid or a multi-cornered conical trapezoid having rounded corners, and said braking pieces have in the form of a conical trapezoid or in the form of a multi-cornered conical trapezoid having rounded corners so that said braking pieces are each inserted into said through hole from the back thereof and said metal supporting member is embedded in the braking face side of said brake body.

17. A device for elevator emergency stop comprising:
   an elastic member having a U shape, opening and closing in a horizontal direction;
   a pair of guide members opposing each other and having outer surfaces contacting the ends of said elastic member, respectively, and inner surfaces inclining such that a gap-between said guide members gradually decreases toward the upper ends of said guide members;
   a rail having a T-shaped cross section, positioned between said guide members and extending in a vertical direction;
   a pair of brake shoes provided in the gap between said guide members, arranged symmetrically with respect to said rail so as to move vertically along the inner surfaces of the guise members, and having braking faces opposing each other; and
   a pair of pulling means attached to said brake shoes, respectively, for pulling upward said brake shoes along said guide members, in the case of emergency, to cause said elastic member to press said guide members so that said brake shoes pinch said rail;
   wherein said brake shoe comprises (a) a brake body having a braking face and (b) a plurality of braking pieces embedded in a braking face side of the brake body to be projected from the braking face to form projections of a column or a multi-cornered pole having rounded corners, and
   wherein said braking pieces are made of a composite material containing a ceramic base material selected from the group consisting of silicon nitride, silicon carbide and sialon, and particles of at least one ceramic material selected from the group consisting of a carbide, a nitride and a boride, each having diameters in the range of 10 to 150 $\mu$m and dispersed into the ceramic base material.

18. An elevator with an emergency stop function comprising:
   an elevating cage;
   an elastic member having a U shape, opening and closing in a horizontal direction and attached to the bottom part of said cage by a supporting means;
   a pair of guide members opposing each other and having outer surfaces contacting the ends of said elastic member, respectively, and inner surfaces inclining such that a gap between said guide members gradually decreases toward the upper ends of said guide members;
   a rail having a T-shaped cross section, positioned between said guide members and extending in a vertical direction;
   a pair of brake shoes provided in the gap between said guide members, arranged symmetrically with respect to said rail so as to move vertically along the inner surfaces of the guide members, and having braking faces opposing each other; and
   a pair of pulling means attached to said brake shoes, respectively, for pulling upward said brake shoes along said guide members, at the time when said cage falls due to the breakdown of said elevator, to cause said elastic members to press said guide members to thee said brake shoes pinch said rail;
   wherein said brake shoe comprises (a) a brake body having a braking face and (b) a plurality of braking pieces embedded in a braking face side of the brake body to be projected from the braking face to form projections of a column or a multi-cornered pole having rounded comers, and said braking pieces are made of a composite material containing a ceramic base material selected from the group consisting of silicon nitride, silicon carbide and sialon, and particles of at least one ceramic material selected from the group consisting of a carbide, a nitride and a boride, each having particle sizes in the range of 10 to 150 $\mu$m and dispersed into the ceramic base material.

* * * * *